United States Patent
Daynes

(10) Patent No.: US 6,772,255 B2
(45) Date of Patent: Aug. 3, 2004

(54) METHOD AND APPARATUS FOR FILTERING LOCK REQUESTS

(75) Inventor: Laurent Daynes, Sunnyvale, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 344 days.

(21) Appl. No.: 09/738,895

(22) Filed: Dec. 14, 2000

(65) Prior Publication Data

US 2001/0032281 A1 Oct. 18, 2001

Related U.S. Application Data

(63) Continuation-in-part of application No. 09/108,064, filed on Jun. 30, 1998, now Pat. No. 6,182,186.

(51) Int. Cl.[7] .......................... G06F 12/14; G06F 13/00
(52) U.S. Cl. ........................................ 710/200; 707/8
(58) Field of Search ................................ 710/200, 240, 710/108, 107, 36; 707/1; 709/104, 107, 201, 100; 711/147, 152, 113; 714/30; 712/208; 717/136, 148

(56) References Cited

U.S. PATENT DOCUMENTS

| 5,440,743 | A | * | 8/1995 | Yokota et al. |
| 5,692,178 | A | * | 11/1997 | Shaughnessy |
| 6,353,828 | B1 | * | 3/2002 | Ganesh et al. |
| 6,412,034 | B1 | * | 6/2002 | Chan |
| 6,539,446 | B1 | * | 3/2003 | Chan |

OTHER PUBLICATIONS

"An adaptable constrained locking protocol for high data contention environments" by S. Goel, B. Bhargava and Sanjay Kumar Madria (abstract only).*
"Multi–view memory to support OS locking for transaction systems" by P. Bodorik and D. N. Jutla (abstract only).*

* cited by examiner

Primary Examiner—Gopal C. Ray
(74) Attorney, Agent, or Firm—Gunnison, McKay & Hodgson, L.L.P.; Philip J. McKay

(57) ABSTRACT

Method and apparatus for locking by sharing lock states. Each resource is associated with a lock state that represents its lock. Lock states are made of one set of transactions per locking mode. Resources may share the same lock state if the state of their respective locks is equal. Locking operations change the association between a resource and a lock state to reflect changes to the resource's lock.

18 Claims, 18 Drawing Sheets

```
   ! %10       : resource on which a read lock is requested
   ! %11       : Execution environment (EE) of the current thread. Contains locking context
   ! %10       : location of the lock state pointer in the resource
   ! %11       : presumed current lock state of the resource
1    add %10, OFFSET_TO (BOTHandle, lock), %10    ! load location of lock state
2    set READ_LOCK_FN_BASE_ADDRESS, %13           ! load base for dispatch
3    ld [%10], %11                                ! load the lock, is never null
  redispatch:
4    ld [%11 + OFFSET_ID (LockState, readop_type)], %o3   ! load offset from lock state's type
5    jmp %13 + %o3                                ! dispatch
6    ld [%11 + OFFSET_ID (EE, sro_lock_state)], %12      ! load this transaction's SRO lock state.
  !
  unlocked_state:
7    ld [%11 + OFFSET_TO (EE, unlocked_lock_state)], %o2  ! load the unlocked state for comparison
  ! According to dispatching, we are here because the lock state that was read is the unlocked state.
  ! A non-blocking synchronization scheme is used to set the SRO lock state of the current locking context.
  ! The atomic test and set instruction cas should set %12 to %o2 for the operation to succeed.
  ! If something different from %o2 to stored in %12, it means another transaction has set its
  ! own lock in the meantime, so we must retry the operation and re-dispatch
  ! to the case that corresponds to the new lock state (stored in %12).
8    case [%10], %o2, %12
9    amp %o2, %12
10   be lockset_update                            ! Branch if lock is acquired
11   ld [%11. OFFSET_IO (ee. LOCKSET_TOP)], %12
12   ! Otherwise, move new lock state value in register %11 for re-dispatch.
13   be redispatch
14   or %12, %g0. %11 lockset_update:
    ...
```

FIG. 13

METHOD AND APPARATUS FOR FILTERING LOCK REQUESTS

This application is a continuation-in-part of Ser. No. 09/108,064 filed Jun. 30, 1998, now issued as U.S. Pat. No. 6,182,186.

BACKGROUND OF THE INVENTION

1. Field of the Invention

This invention relates to the field of computer software, and, more specifically, to transaction processing and object or resource locking.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Solaris, Java, JavaOS, JavaStation, HotJava Views and all Java-based trademarks and logos are trademarks or registered trademarks of Sun Microsystems, Inc. in the United States and other countries.

2. Background Art

In modern computing environments, it is commonplace to store and access a variety of diverse information and data. To efficiently utilize the information, the information is stored in a database and is structured in a manner that provides a user with the ability to interpret and manipulate the information (referred to as a "data structure"). One type of database structure is in the form of a table, where each row of the table contains a record and each column specifies a field in the record. For example, a table can be used to store information regarding a company's inventory where each record is a specific item in the inventory and each field specifies information about the item (e.g., the name of the product, the price of the product, etc.). Data structures may vary depending on the application and type of database utilized. As a result of the diverse types of information being utilized (e.g., text, images, sound, video, etc.), data structures have grown increasingly complex.

Each time a computer system performs an activity, the activity is referred to as a transaction. For example, when a customer order is entered, or an inventory item is updated, a transaction for each activity is executed by the computer system. Thus, when information in a data structure is accessed or manipulated, a transaction is executed by the computer system. A transaction may need access to a record in a database or a portion of information in a database. Alternatively, a transaction may modify the entire database. When executing transactions, a computer system may execute a group of transactions at one time (referred to as batch processing), or may execute each transaction immediately after the transaction is received by the system (referred to as transaction processing). Transactions contain certain properties that must be adhered to. For example, transactions must be isolated such that each transaction must be contained separately from each other transaction. Additionally, transactions must provide for recoverability (the ability to establish a previous or new status from which execution can be resumed in the event of a system or execution failure). Required transaction properties are also referred to as low level details of a transaction.

In many modern applications, increasingly complex data structures coupled with transaction processing capabilities is becoming a common requirement. The complexity of these applications, in terms of the data structures, algorithms, and type of the transactions used, does not fit well in the framework offered by traditional database systems. Persistent programming languages (PPL) (programming languages that provide for data to have a lifetime that persists for a specified amount of time) that support transaction processing may be utilized by programmers as an alternative or in combination with traditional database systems. To provide adequate support, some PPLs automatically enforce required transaction properties. Thus, low level transaction details (e.g., enforcing a transaction's properties) are automatically performed without input from a programmer.

One automated low level detail consists of the acquisition and release of a lock. A lock is a mechanism that restricts use of a resource to the holder of the lock. By locking a resource, the integrity of the data in the resource is ensured by preventing more than one user (or transaction) from accessing or changing the same data or object at the same time. Locking is a popular technique to implement concurrency control for a transaction processing system. Programming systems that tightly couple a transaction processing engine with a high-level programming language usually include in their runtime a component that automates the requesting of locks on behalf of executing programs. Such automation of locking guarantees that transactions are well formed (i.e., that the transaction holds the lock of a data item in the correct mode prior to executing an operation on that data item). Relational, object-oriented, and object-relational database systems as well as persistent and database programming languages have recourse to such locking automation, both to simplify the programmer's work and to avoid depending on the programmer to always formulate well formed transactions. There are several types of locks that may be used.

One type of lock is a shared lock. A shared lock permits multiple transactions to read (view) an item simultaneously without any modification or addition to the item (no writing is permitted). A shared lock is referred to as permitting concurrent (or concurrency) control by a transaction (i.e., multiple transactions are permitted to concurrently access a resource). Another type of lock is an exclusive lock. An exclusive lock permits one transaction to read and write to an item while excluding all other transactions from reading or writing to the item.

The locking and unlocking of resources must be administered to ensure that any required lock properties are complied with. For example, two or more different transactions cannot each acquire an exclusive lock at the same time for the same resource. Additionally, locks must be administered to provide a queue for transactions that are waiting to acquire a lock, and to rollback any executed actions if a deadlock results (i.e., when each of two transactions are waiting for a lock release from the other before continuing). For example, a deadlock occurs if transaction 1 has a lock on resource A and is waiting to acquire a lock on resource B, and transaction 2 has a lock on resource B and is waiting to acquire a lock on resource A.

A locking protocol partially determines the administration of a locking and unlocking of resources. A locking protocol determines how and when a transaction is granted (or acquires) a lock for a resource and when the resource is unlocked (i.e., the lock is released allowing other transactions to acquire a lock on that resource). A lock manager administers a locking protocol.

For example, in a two-phase locking protocol, each transaction issues a lock and unlock request in two phases. In one phase, referred to as the growing phase, a transaction may obtain locks but may not release any lock. In the second phase, referred to as the shrinking phase, a transaction may release locks but may not obtain any new locks.

Another protocol, referred to as a graph-based protocol, a partial ordering of information in a database is performed. For example, a set R of resources consisting of $R_1$, $R_2$, $R_3$, ..., $R_h$ is ordered such that $R_i \rightarrow R_j$. In this manner, any transaction accessing both $R_i$ and $R_j$ must access $R_i$ before accessing $R_j$. With this ordering, the set R may be viewed as a directed acyclic graph, called a database or resource graph. A directed graph may be viewed as the tree of FIG. 2, where each node of the tree is a resource. Each resource descends from another resource (referred to as a parent resource) up to the root of the tree that has no parents (resource A 200). In a graph-based protocol, the following rules are followed: (1) the first lock by a transaction T may be on any data item, (2) subsequently, a data item or resource R can be locked by T only if the parent of R is currently locked by T, (3) resources can be unlocked at any time, and (4) a resource that has been locked and unlocked by T cannot subsequently be relocked by T. For example, referring to FIG. 2, if T needs access to resource C 204, both resource C 204 and resource A 200 must be locked. Similarly, if T needs access to resource J 218, in addition to locking resource J 218, all of the parents of resource J 218 must be locked (i.e., resources H 214, D 208, B 202, and A 200). Thus, in some cases, a transaction must lock resources that it does not access (i.e., the parent resources of a resource being accessed).

FIG. 3 demonstrates an example of lock acquisition according to a traditional protocol. In the traditional protocol, each resource is allocated a lock data structure. This lock data structure is updated every time a lock operation changes the state of the resource's lock. FIG. 3 demonstrates a scenario where two resources, $O_1$ 300 and $O_2$ 302, have been read by a transaction $T_1$, and $O_2$ 302 is about to be read by transaction $T_2$. The state of the lock of each resource is shown before (304–306) and after (308–310) the acquisition of the lock on $O_2$ 302 by $T_2$. When transaction $T_2$ requests the lock on resource $O_2$ 302 in read mode, the lock data structure associated with $O_2$ 302 is updated to reflect the new lock state (i.e., lock owned by $T_1$ and $T_2$ in read mode).

Each of the lockable resources may be a record in a database, a field of a record, an entire database, or in an object oriented system (discussed in detail below) a single object, for example. The size or level of the lockable resource is referred to as the granularity of the resource (e.g., the field level v. the record level v. the table level).

A lock is comprised of a data structure that records the identity of the transactions that are given the right to execute operations on the resource the lock protects. Each time a lock is acquired, memory is used for the lock data structure. The memory utilized by the lock remains unavailable until released through garbage collection or some other method. Consequently, one goal in lock administration is to minimize the memory locks consume, which usually translates in minimizing the number of locks.

The process of creating and manipulating a lock is time consuming. Thus, another goal in lock processing is to minimize the lock processing cost for acquiring and releasing a lock.

As resource granularity becomes finer, more resources are available for transactions. Such resource availability occurs because locks are placed on smaller resource units, freeing remaining resources that may be locked if the resource is coarser. Consequently, another objective in lock processing is to utilize a fine resource granularity.

Locking may be performed manually by programmers who then explicitly put lock requests in their programs, or automatically at runtime without input from programmers. When applied in the context of general purpose programming languages, both solutions may result in many unnecessary redundant lock requests (i.e., a lock request for a lock already owned) because of the complex data structures and algorithms these programming languages enable. Consequently, one goal of lock management is to minimize the processing time spent to process redundant lock requests.

The objective of a lock management implementation is to obtain the best combination of low memory consumption, low processing costs, and fine granularity of locking.

When the programming interface is a rich programming language (e.g., the Java™ programming language), a problem that is encountered is that locking automation can result in an overwhelming number of generated lock requests. However, each lock request that is issued is not always necessary. Lock requests that, for example, target an immutable data item or an object created by the lock requester may not be necessary. The term object may refer to any data item. Objects created by the lock requester are typically out of reach of other transactions until the requester commits and are therefore not always necessary (if ACID transactions are used). In other instances, the requester already holds a lock in a mode equivalent or stronger on the requested data item and thus another lock request is unnecessary. A problem encountered by current locking systems is that in many instances these unnecessary requests are issued and thereby result in additional processing overhead. When automated locking system is interfaced with a lock manager that uses lock-value sharing with memoization, the problem becomes increasingly complex. Memoization is an algorithmic technique that saves (memoizes) a computed answer for later reuse, rather than recomputing the answer. The computed answer is typically saved in cache memory so that it can be quickly accessed. A memorized function remembers the arguments to which it has been applied together with the resulting computation. If the function is re-applied to the same argument, the function returns the cached answer rather than repeating the computation. Memoization can be used in conjunction with a lock manager that uses shared lock states to avoid calls to the lock manager, and thus, speed up the processing of lock request. Below is some pseudo code to show how memoization works in the context of a lock manager that use lock state sharing. The memoization cache in this particular example consists of a single line per type of request (e.g., request for a read lock, request for a write lock, etc.).

```
LockState currentLockState = object.currentLockState;
MemoizationCache mcache = currentThread( ).
getMemoizationCache( );
if (mcache[Request].currentLockState == currentLockState) {
    success = atomicCompareAndSwap(&object.currentLockState,
        currentLockState, mcache[Request].requestResult);) if
(!success) }
    LockManager.processRequestAndUpdateMemoizationCache
    (currentThread( ),Request,object);)
```

Practical implementation of this pseudo-code takes from 4 to 8 assembler instructions, depending on what is already cached in machine registers. The sequence of instructions that performs the memoization of a lock manager operation is typically inlined in the application code. Two phenomenon currently limit the effectiveness of the memoization cache of a transaction:

1. the frequent interleaving of accesses to objects pre-existing the transaction and objects created by the transactions.
2. the frequent interleaving of accesses to mutable and immutable object (e.g., instance of java.lang.String in the Java™ programming language)

When automated locking system is interfaced with a lock manager that uses lock-value sharing with memoization unnecessary lock requests significantly decrease the efficiency of the memoization cache and results in a dramatic performance loss. Thus there is a need for a method to improve the efficiency of memoized lock operations in order to increase the performance of automated locking systems. More particularly there is a need for a system that improves the performance of automated locking systems that are interfaced with a lock manager that utilizes lock-value sharing with memoization.

Lock requests directed at immutable and new objects may be unnecessary. One simple way to filter such lock requests is to tag such object as immutable, and test this tag prior to process a lock request for such objects. To avoid adding space to the object representation, the tag can be stored in place of the lock pointer of the object. A similar technique can be used for objects created by the current transaction. Lock request directed as either an immutable or a new object can then be filtered by testing the value of the lock pointer against either an "immutable object" tag, or the "created object" tag of the transaction that performs the test, prior to processing a lock request. A problem with this solution is that it increases the pathlength of lock request with two additional tests and a branch. Thus, there is also a need for a system that more efficiently filters lock requests directed at immutable and/or objects allocated by transactions.

SUMMARY OF THE INVENTION

The present invention provides for low space-overhead locking for transaction processing systems by sharing lock states. Each resource or object has an associated lock state. A lock state is comprised of a set of transactions that own a lock in a specific mode. Among other modes, a locking mode may comprise a read mode or a write mode.

Resources may share the same lock state if the state of their respective lock is equal. During its lifetime, a resource may be associated with various lock states, each lock state being the representation of the lock of that resource at a given time. Locking operations change the association between a resource and a lock state, should such a change be necessary.

In one embodiment of the invention, a table of immutable lock states (TILS) records all of the immutable lock states that were created by lock operations in order to avoid duplication of lock states with equal value. Locking operations (e.g., acquire, release) that yield new lock state values must consult the TILS to retrieve the corresponding immutable lock state.

To acquire a lock on a resource R, after ensuring that there is no conflicts, the value of a new lock state is computed by adding the current transaction to the lock state currently associated with R. The computed lock state value is used to retrieve an immutable lock state from the TILS (if no such lock state exists, a new one is registered to the TILS and is returned). The lock acquisition completes by updating the association of the resource to the new lock states returned by the TILS.

To release a lock for a specific resource, the transaction determines the lock state value that will result after removing itself from the lock state for that resource. The computed lock state value is used to retrieve an immutable lock state from the TILS (if no such lock state exists, a new one is registered to the TILS and is returned). The lock release completes by updating the association of the resource to the new lock states returned by the TILS.

As described, all lock operations perform transitions of lock states that are both deterministic and independent of the locked resource. If a locking operation for a transaction T on a lock state S1 yields a state S2, it will always do so, independently of the resource the operation applies to. For instance, acquiring a read lock for a transaction T1 on a resource R associated with a lock state consisting of a read owner set that contains T2 will always yield a lock state made of a lock owner set that contains T2 and T1, whatever the resource R is. In one embodiment of the invention, lock state transitions (e.g., acquire (T1, Read): Owner(Read)= {T2}∅Owner(Read)={T2,T1}) are cached to avoid both computation of lock states and look up in the TILS. Each transaction maintains one lock state transition cache per locking operation.

When a transaction has completed execution, all resources associated with the transaction must be released. In one embodiment, the transaction maintains a lock set that maintains information regarding each resource for which it has obtained a lock. The transaction then releases each resource in the lock set as described above. In one embodiment, the lock set is implemented in a stack where each reference is pushed onto the stack when the lock is acquired and popped when the lock is released. In another embodiment, lock sets are not maintained and the TILS is scanned upon transaction completion to determine which lock states contained the transaction as an owner.

A problem encountered by the automated locking systems described above is that such systems are often required to process unnecessary lock requests. These unnecessary lock requests add processing overhead and therefore slow down the system. An embodiment of the invention provides a way to reduce the volume of unnecessary lock requests and thereby increase the efficiency of the system. The volume of unnecessary lock requests is reduced in accordance with one embodiment of the invention, by filtering unnecessary lock requests at runtime. The filtering process allows the system to avoid the processing overhead required to process a lock request at the lock manager when such processing is not necessary. Thus, an embodiment of the invention defers processing by the lock manager unless such processing is required.

BRIEF DESCRIPTION OF THE DRAWINGS

FIG. 13 demonstrates dispatching to specialized code and non-blocking synchronizations according to one embodiment of the invention.

DETAILED DESCRIPTION OF THE INVENTION

The invention is a method and apparatus for low space overhead locking for transaction systems. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Embodiment of Computer Execution Environment (Hardware)

Figure 1:
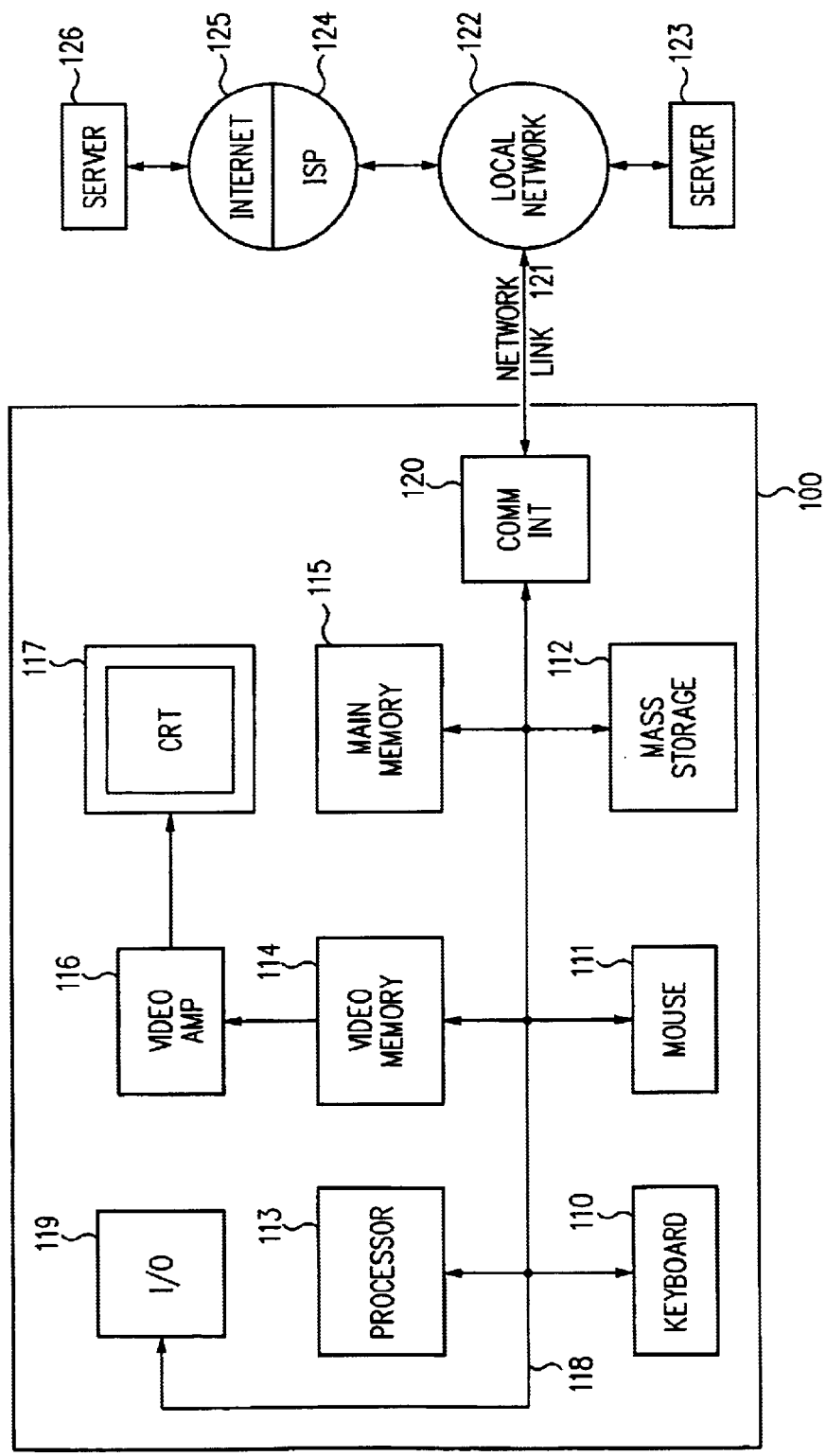
FIG. 1 is a block diagram of one embodiment of a computer system capable of providing a suitable execution environment for an embodiment of the invention.
Figure 2:
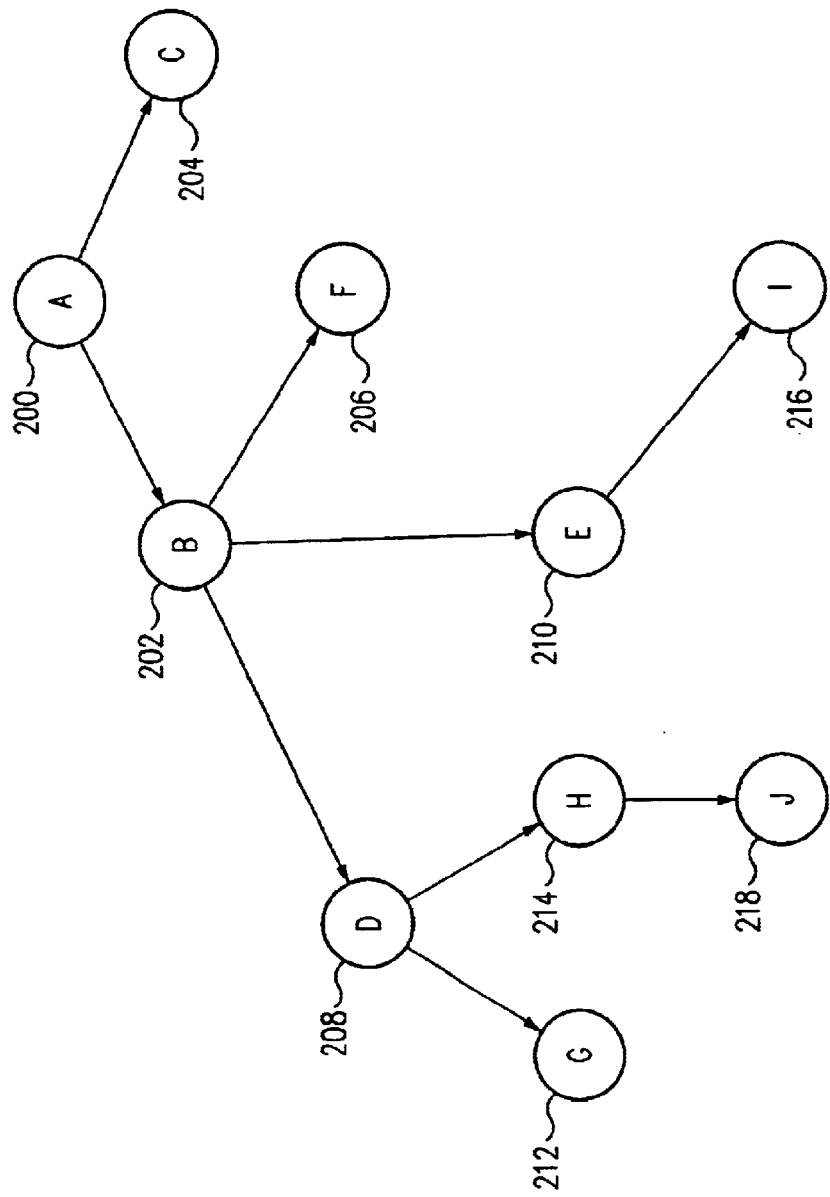
FIG. 2 demonstrates a tree for a graph based locking protocol.

An embodiment of the invention can be implemented as computer software in the form of computer readable code executed on a general purpose computer such as computer 100 illustrated in FIG. 1, or in the form of bytecode class files running on such a computer. A keyboard 110 and mouse 111 are coupled to a bidirectional system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to bidirectional system bus 118 represents such I/O elements as a printer, A/V (audio/video) I/O, etc.

Computer 100 includes a video memory 114, main memory 115 and mass storage 112, all coupled to bidirectional system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680X0 processor or a microprocessor manufactured by Intel, such as the 80X86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120. In accord with the invention, one such application is that of remotely configuring a computer.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Utilization of Computer Software

Resources and transactions may contain multiple related functions and data structures. One embodiment of the invention utilizes a standard object oriented programming (OOP) language to write and encapsulate an application's transactions, functions, and data structures. To provide an understanding of encapsulation of related data structures and methods, an overview of object-oriented programming is provided below.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class.

An object is a generic term that is used in the object-oriented programming environment to refer to a module that contains related code and variables. A software application can be written using an object-oriented programming language whereby the program's functionality is implemented using objects. The encapsulation provided by objects in an object-oriented programming environment may be extended to the notion of resources, locks and lock states as described below. Object locking provides for the association of each object with a distinct lock.

Embodiment of Software Apparatus for Lock States

One embodiment of the invention provides for a method and apparatus for a lock manager to utilize lock states that represent the state of a lock.

As described above, a lock is a data structure that records the identity of the transactions that are given the right to execute operations on the resource the lock protects. The transactions recorded by a lock are called the owners of that lock. A transaction is recorded by the locking modes (e.g., read or write mode) the transaction is granted to. There is one locking mode defined per kind of operation (locking modes and operations are discussed below). As a result, a lock has one set of owners (transactions that are granted the lock) for each locking mode that the lock must keep track of. The set of the values of each of the owners of a lock is referred to as the state of a lock (or lock state).

As described above, prior art methods provide for the creation of locks in lock data structures. The present invention does not utilize locks with a material existence in the form of lock data structures but provides for immutable lock states (lock states that are not capable of or susceptible to change). Each lock state represents a particular state of one or more locks. Resources share the same immutable lock state if the state of their respective lock is equal. During its lifetime, a resource may be associated with various lock states, each lock state being the representation of the lock of that resource at a given time. Locking operations change the association between a resource and a lock state, should a change of state be necessary. This association materializes the resource's lock. Prior to granting a lock, a determination is made as to whether the lock to be granted conflicts with an existing lock.

Lock states may also be viewed as follows: a transaction T is granted the lock 1 protecting a resource R in a mode M according to some conflict detection function that determines whether the request <T,M> conflicts with the current state of the lock 1. When a lock 1 is granted in mode M to a transaction T, T is added to the owner set that corresponds to M to reflect the new state of the lock. Inversely, when a transaction releases a lock, it is removed from all the owner sets in which it appears. Examples of lock states are discussed below.

The role of the lock manager in a lock state environment is to maintain the correct association of locked resources and immutable lock states. For this purpose, the lock manager maintains an associative table of immutable lock states, we will refer to as the TILS hereafter. The TILS contains all of the available immutable lock states. To access an entry in the TILS, a key that is unique for every lock state in the table is utilized. One key that may be utilized is the value of the lock state itself since this is the only information known when changing the state of the lock of a resource. Lock states are added or removed from the TILS as needed. Garbage collection techniques determine unused lock states and remove them from the TILS.

As described above, lock states are immutable, and can therefore be shared between several resources. The association between a resource and a lock state is changed whenever a locking operation changes the state of a resource's lock. The most commonly used locking modes are read and write. In the description of the invention, only these two modes are considered for concision though the invention works with additional arbitrary locking modes. Hence, for the remainder of the description, a lock state is made up of two owner sets: a read owner set and a write owner set.

EXAMPLE 1

Figure 3:
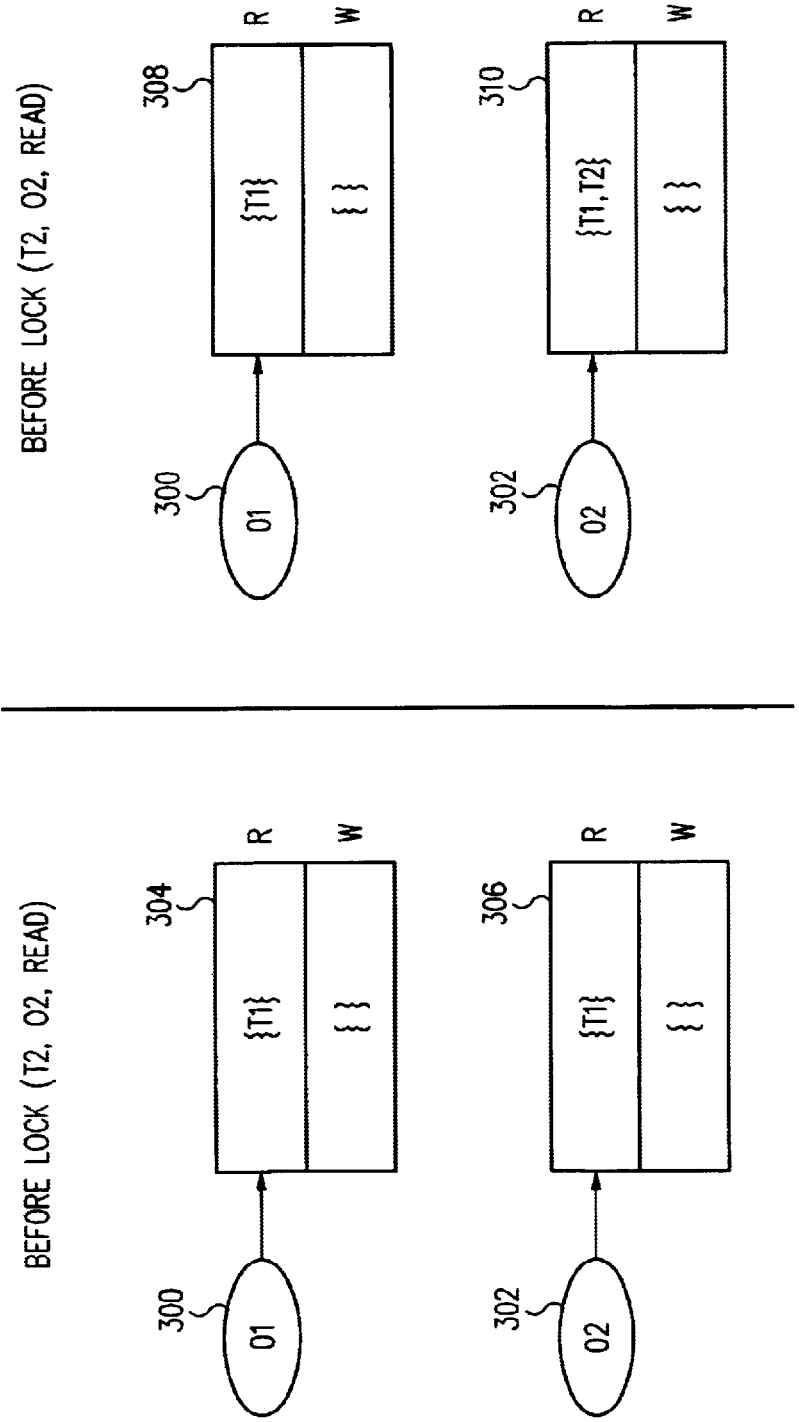
FIG. 3 demonstrates the locks in a traditional protocol before and after a transaction acquires a lock.
Figure 4:
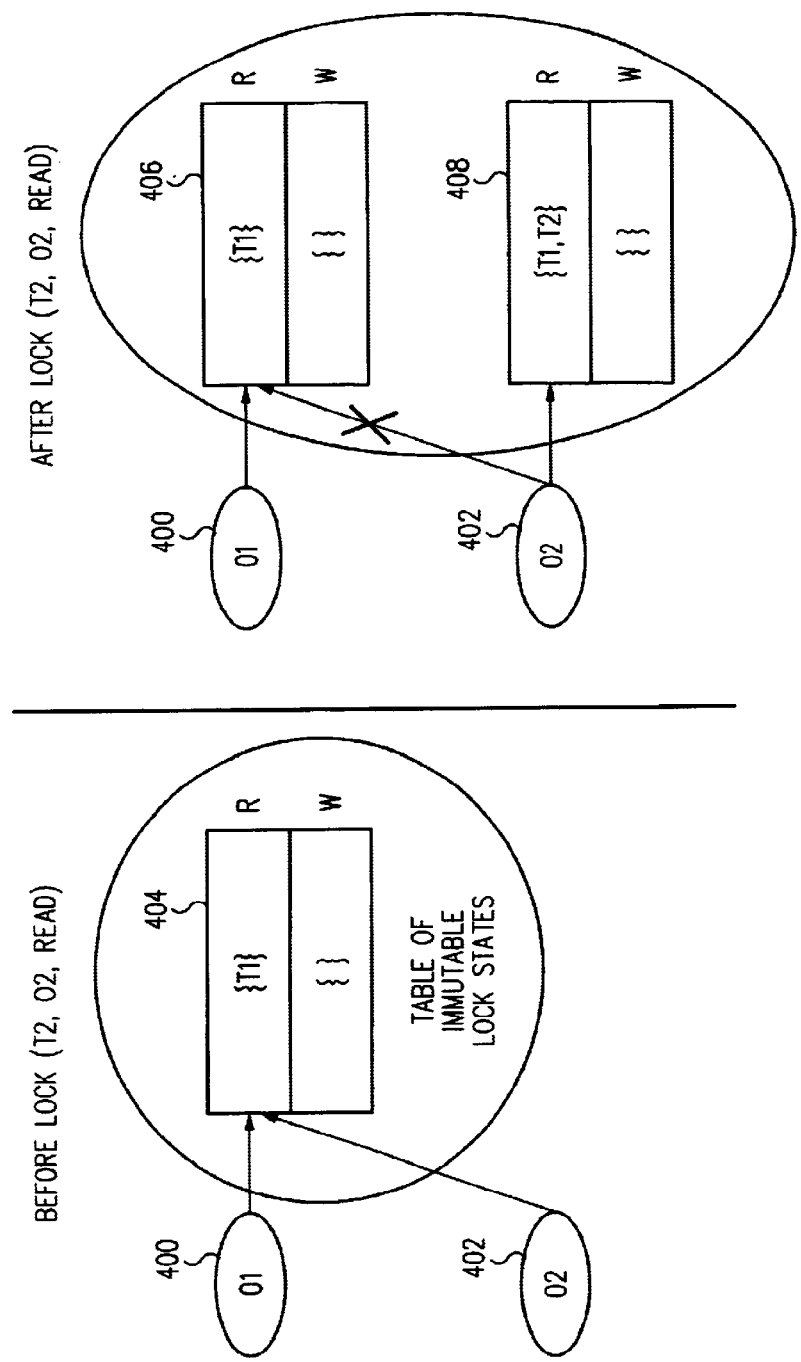
FIG. 4 demonstrates sharing of lock states before and after a transaction acquires a lock.

FIG. 4 demonstrates the scenario described above with respect to FIG. 3 using lock states instead of locks. Two resources, $O_1$ 400 and $O_2$ 402 have been read by a transaction $T_1$, and $O_2$ 402 is about to be read by $T_2$. Before the read by $T_2$, FIG. 4 demonstrates that both $O_1$ 400 and $O_2$ 402 are read by transaction $T_1$ and thus have the same lock state 404, a set consisting of $T_1$ for a read mode. After $T_2$ has performed a read of $O_2$ 402, both resources $O_1$ 400 and $O_2$ 402 share the same lock state which corresponds to the state each data structure representing their respective lock would be in. The acquisition of $O_2$'s lock by $T_2$ changes $O_2$'s lock state association 404 to a new lock state 408. Since that new lock state does not exist yet in the TILS, a lock state 408 with an empty write owner set and a read owner set made of $T_1$ and $T_2$ is created as the result of the lock operation on $O_2$ 402. Comparing FIGS. 3 and 4, before the execution of $T_2$, FIG. 3 demonstrates the use of two locks 304 and 306, compared to the one lock state 404 of FIG. 4. After the execution of $T_2$, FIG. 3 demonstrates two locks 308 and 310 (that are the same locks as locks 304 and 306 respectively), and FIG. 4 demonstrates two lock states 406 (the same lock state as lock state 404) and 408. The next time a resource's lock changes to the same state, for instance, if $T_2$ acquires a read lock on $O_1$ 400, the lock state will already be available.

EXAMPLE 2

Figure 5:
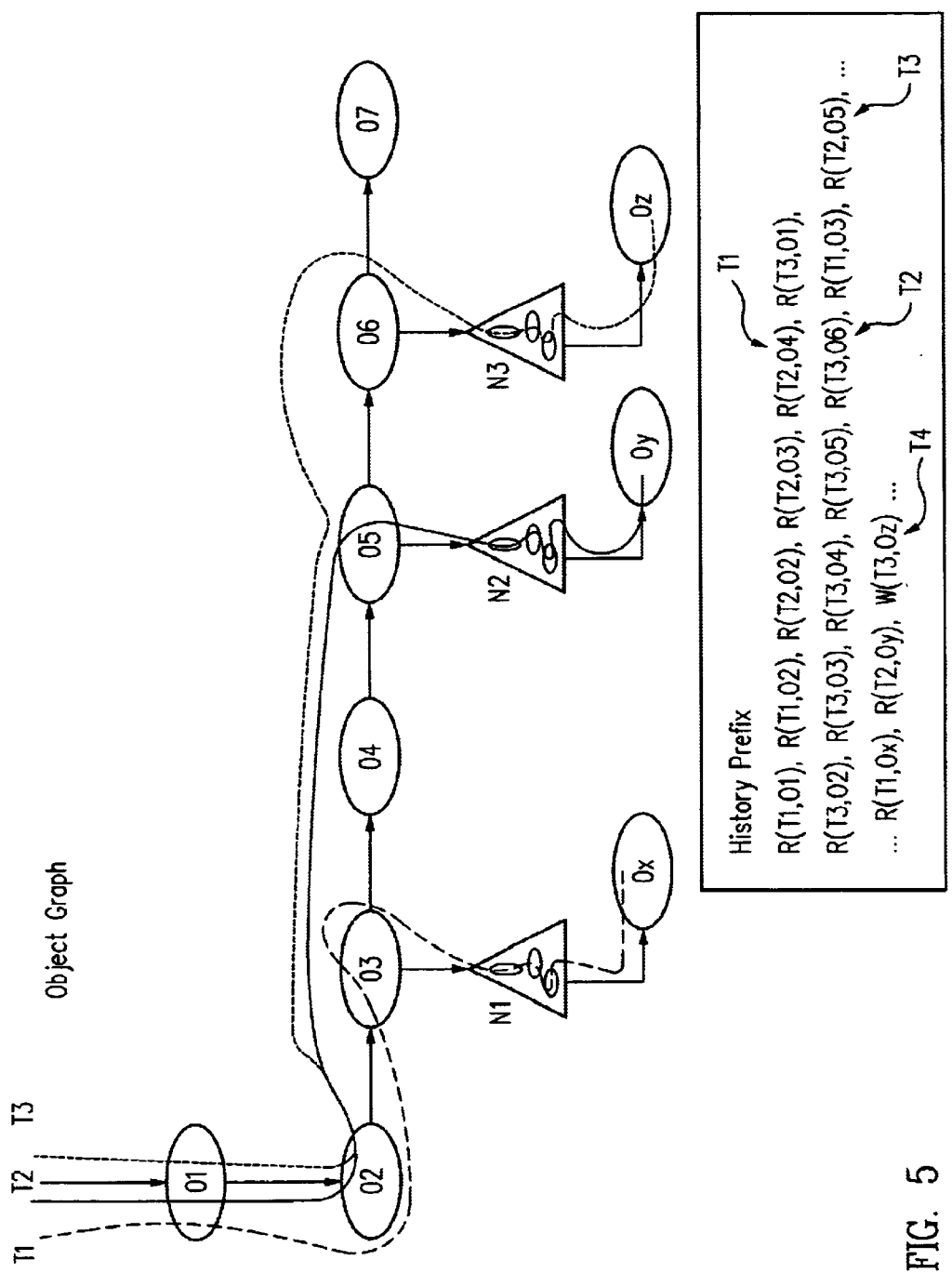
FIG. 5 illustrates the access path of three transactions through a graph of resources and a history of operations that corresponds to one possible execution of the three transactions traversing this graph.

FIG. 5 demonstrates the flow of several transactions T1–T3 through various resource objects $O1-O_z$ (the object graph). Triangles rooted at resource objects $O_3$, $O_5$ and $O_6$ represent sub-graphs containing, respectively, $N_1$, $N_2$ and $N_3$ resource objects.

A history of a possible execution of three transactions, $T_1$, $T_2$ and $T_3$, that traverse different overlapping portions of the graph is shown as the history prefix of FIG. 5. A curved line corresponding to each transaction shows the path followed through the object graph by each transaction.

Figure 6:
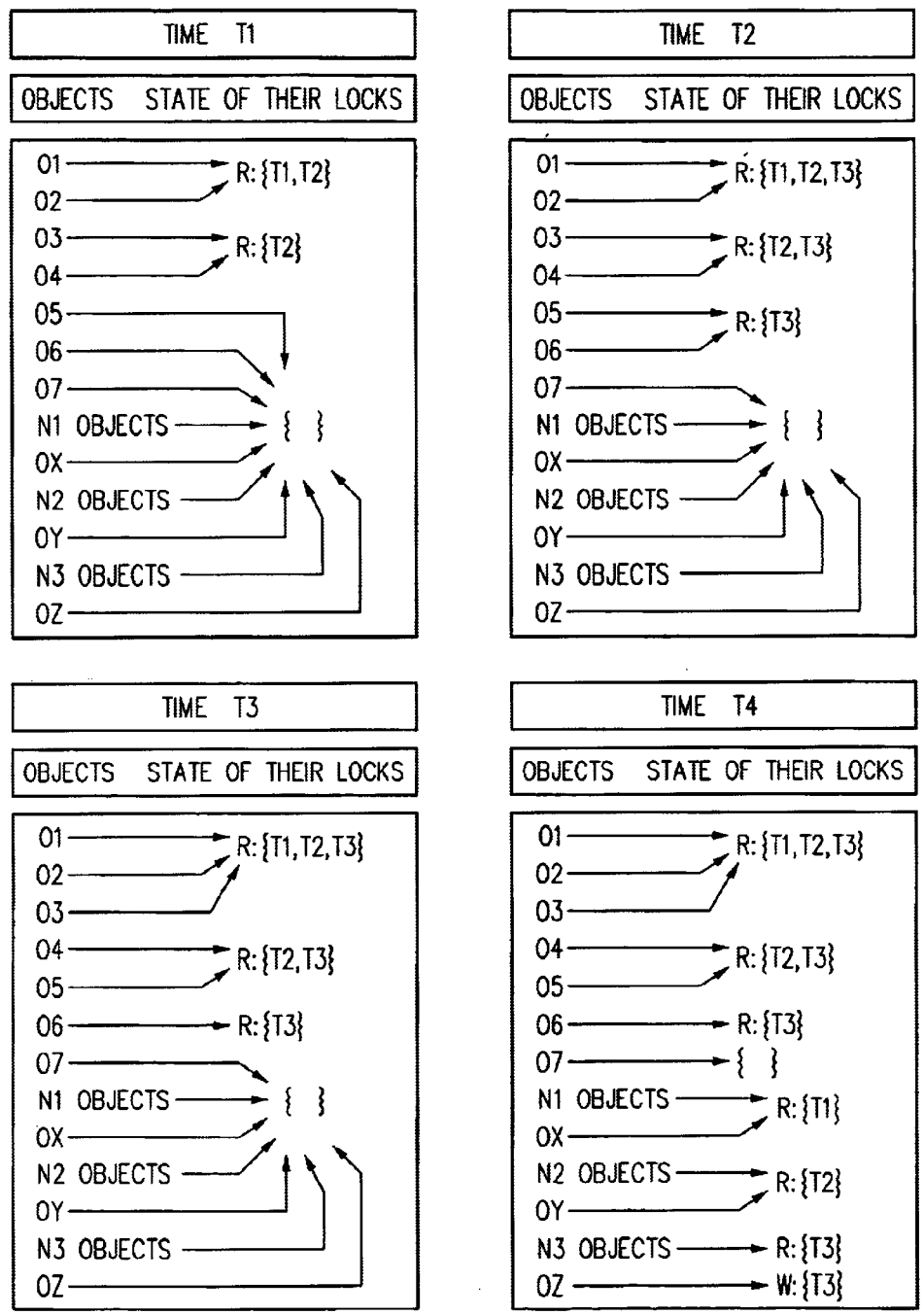
FIG. 6 demonstrates the sharing of lock states of the resources of FIG. 5 at four time intervals.

FIG. 6 demonstrates the state of each object lock of FIG. 5 at four different times in the history ($t_1$, $t_2$, $t_3$, and $t_4$). Only the non empty owner sets of the state of each lock is shown. Each owner set shown is tagged with a letter that indicates the corresponding locking mode: R for read mode and W for write mode.

At time $t_1$, the states of $O_1$'s lock and $O_2$'s lock are identical, as are the state of $O_3$'s and $O_4$'s locks as indicated by $O_1$ and $O_2$ pointing to the same lock state and $O_3$ and $O_4$ pointing to the same lock state. All other objects have their lock in an unlocked state, i.e., all the owner sets of these locks are empty, and thus point to the same lock state. Conceptually, objects that are not manipulated by any transactions are given an empty lock, though in one embodiment, no lock is allocated for such objects. Instead, locks are allocated on demand whenever a lock request is issued for an unlocked object. The object is then dynamically associated with that lock. The lock data structure is freed when the object it protects is unlocked. In the following, we will omit unlocked states when discussing space overhead but for clarity, we have represented them in FIG. 6.

TABLE 1

Number of locks vs. number of lock states

| time | # of locks | # of lock states |
|---|---|---|
| t1 | 4 | 2 |
| t2 | 6 | 3 |
| t3 | 6 | 3 |
| t4 | 9 + N1 + N2 + N3 | 6 |

Table 1 reports for each given time in the history of FIG. 6 the number of locks and the number of lock states. From this table, one can see that on average, based on the history prefix, the number of lock states is at worse 50% smaller than the total number of locks (assuming $N_1$, $N_2$, $N_3$ are all greater or equal to 1). The total number of lock states can be as small as 1, (e.g., when the working sets of all active transactions overlap exactly). However, when the working sets of transactions don't overlap at all, the number of lock states is the number of active transactions.

Assuming that no constraint exists to define what combination is a valid lock state, and that conflicts never happen, the maximum number of possible lock states may be computed as follows: Let T(t) be the set of active transactions at time t. The value of an owner set can be any subset of T(t). Thus, the number of possible values for one owner set is the cardinality of p(T(t)), the power set of T(t), which has cardinality $\&p(T(t))\&=2^{\&T(t)\&}$. Assuming M different locking modes, the total number of possible lock states is $(2^{\&T(t)\&})^M = 2^{M\&T(t)\&}$. With M=2 and 10 active transactions, there are approximately 1 million possible states for a lock.

In a transaction processing system, two factors may reduce the number of lock states:

1. Constraints imposed by the transaction model on what constitutes a valid lock state: transaction models prevent some lock states from ever happening since they correspond to situations the locking protocol prevents from happening (e.g., two owners in exclusive mode).
2. The regularity of data structures and algorithms prevents some lock states from ever happening.

As an example, let us assume the ACID transaction model (a system that utilizes transactions that maintain atomicity, consistency, isolation, and durability (ACID)) with the two locking modes, read and write. This model prevents any lock states with more than one transaction in the owner sets corresponding to the exclusive mode (the isolation property). Thus, a valid lock state has either its write owner set empty, or its read owner set empty and a singleton as a write owner set. If such a model is used, then, the total number of possible lock states is the sum of:

$2^{\&T(t)\&}$, the number of lock states corresponding to locks granted in read mode only, and &T(t)&, the number of lock states corresponding to locks granted in write mode only, that is, $2^{\&T(t)\&}+\&T(t)\&$.

As described, the total number of lock states cannot exceed the total number of locks, should each existing lock be in a distinct state.

Lock Operation

A general description of lock states is set forth above. The detailed operation of locks including the acquisition and release of locks according to one embodiment of the invention are described below.

Lock Acquisition

Figure 7:
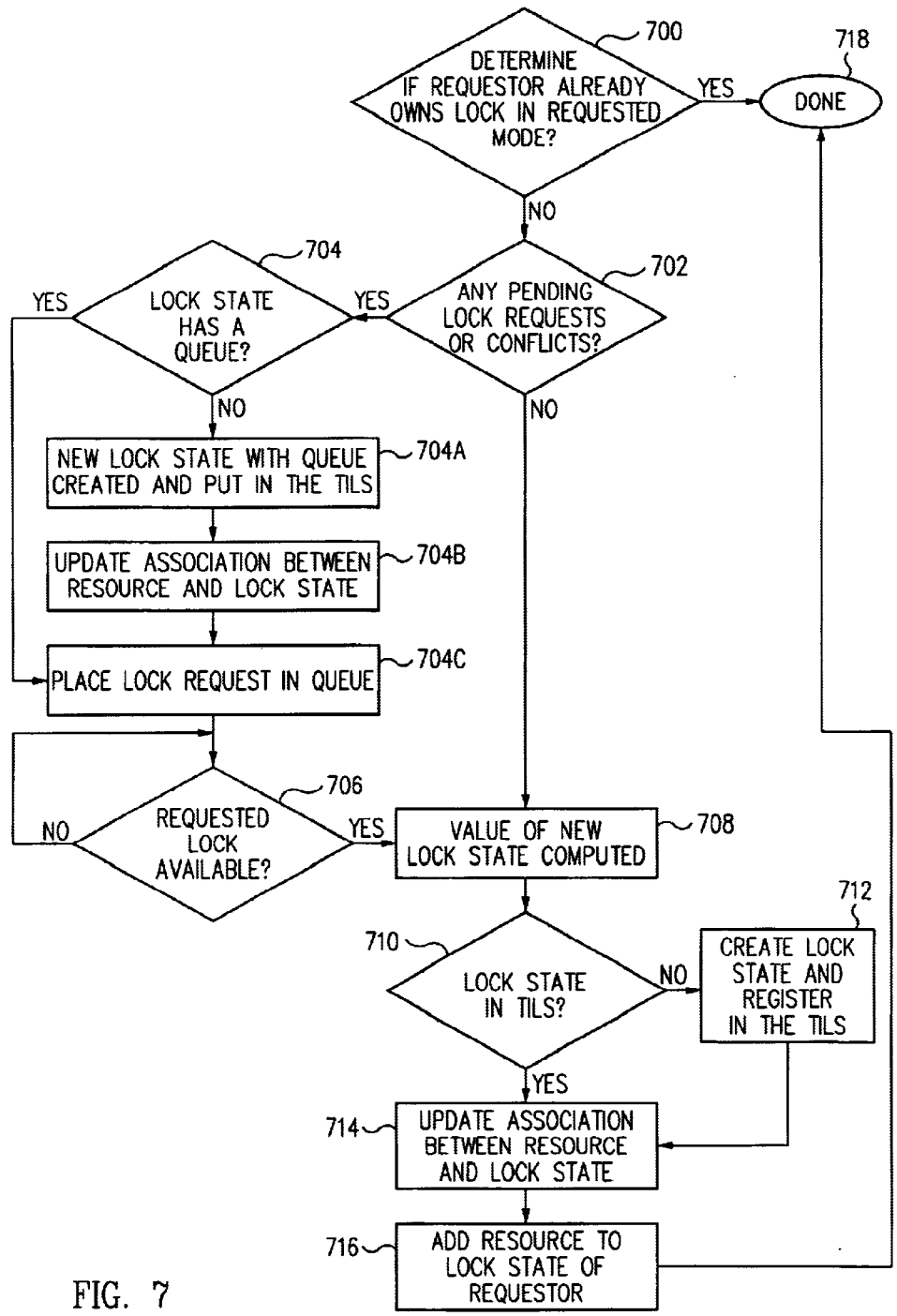
FIG. 7 illustrates the lock acquisition process according to one embodiment of the invention.

FIG. 7 illustrates the lock acquisition process according to one embodiment of the invention. At step 700, the lock manager determines if the transaction requesting the lock already owns the lock in the requested mode. If the transaction already owns the lock in the requested mode, then there is no change in the lock state and processing continues at step 718.

If the transaction does not own the requested lock, the lock manager checks for any conflicts with the existing locks and for the absence of any pending lock requests (by other transactions) at step 702. If there is a conflict but no pending lock request (determined at step 704), a new lock state with a queue is created and entered in the TILS at step 704.a. This new lock state differs only from the previous lock state that caused the conflict by the addition of a queue of pending requests. The association between the requested resource and a lock state is updated accordingly at step 704.b, and the lock request is added to the queue at step 704.c. If a queue was located for the lock state (at step 704), the lock manager adds the request to the queue at step 704.c. In one embodiment, the queue is processed in first-in-first-out (FIFO) order. At step 706, the lock manager waits for the requested lock to become available. In one embodiment, a lock may become available when the conflict is cleared (e.g., when the lock is released by another transaction) and when transactions that were ahead of the current requestor in the queue have been processed.

Once all conflicts have been cleared and the lock manager determines that the current transaction may be granted the desired lock, the value of the new lock state is determined at step 708. The new lock state value is determined by adding the transaction that is granted the lock to the owner set corresponding to the requested lock mode. This new lock state value (stored in a temporary variable) is used as a key to lookup if a corresponding immutable lock state value has already been registered in the TILS at step 710. If such a lock state does not exist in the TILS, a new one is created with this value and registered in the TILS and returned at step 712. At step 714, the association between the resource and the lock state representing its lock is then updated to refer to the lock state retrieved (at step 710) or created (at step 712).

At step 716, the resource is added to the set of locks (referred to as lock set) owned by the requester.

The above steps are further illustrated by the following pseudo code:

```
1  acquire_lock(Resource R, LockingMode M, Transaction T)
2  begin
3     LockState l ← lock(R);
4     if  (T Owner(l,M))
5        return GRANTED
6     endif
7     if ( Q(l) = ∆IOwner(l,M) ℵ  {T})
```

The above steps are further illustrated by the following pseudo code:

```
8        /* wait case */
9     endif
10    LockState l₂ ← l
11    Owner(l₂,M) ← Owner(l₂,M) ≈ {T}
12    lock(R) ← TILS.lookup(l₂)
13    lockset(T) ← lockset(T) ≈ {R}
14    returnGRANTED
15 end
```

In the above pseudo code, the state of a lock is comprised of one owner set per locking mode. Owner(l,M) is defined as the owner set of lock 1 that corresponds to the locking mode M. Each owner set records the transactions that were granted the lock in the corresponding mode. When considering only read and write locking modes, a lock state is a pair <Owner(1,Read),Owner(l,Write)>. The state of locks with pending lock requests due to a conflict(s) is augmented with a set Q(l) of pairs <T, M>, where T is the suspended transaction, and M is the mode requested by T.

In one embodiment of the invention, a compatibility matrix defines the compatibility between locking modes. This matrix can be represented as a function Compatible $(M_1, M_2)$ that states whether a mode $M_1$ is compatible with $M_2$. Using the compatibility matrix, IOwner(l,M) is defined as the set of transactions that own lock 1 in a mode incompatible (I) with mode M. This set is defined as:

$$IOwner(l,M) = \approx Owner(l,M_1) \; \forall M_1 | Compatible(M,M_1)$$

For instance, IOwner(l,Write)=Owner(l,Write)≈Owner(l, Read). This equation illustrates that if a write lock exists, the set of incompatible owners consists of the owners of other write locks and read locks (since a read and write lock on the same resource are incompatible with each other).

The absence of a conflict between a request for a lock 1 in a mode M by a transaction T and the state of l is given by:

$$IOwner(l,M)\Pi\{T\}$$

In other words, if the above condition is complied with, then the lock can be granted.

In addition to updating the lock states as described above, the lock manager records, for each transaction T, the locks that have been granted to T in order to release the granted locks upon T's completion (irrespective of how T completes). However, since locks have no material existence, in one embodiment they cannot be recorded and the transactions themselves keep track of the resources they have a lock on. Releasing a lock on a resource R operates as a change of the association between R and the lock state that embodies R's lock. As described above, lock (R is defined as the lock state associated to resource R, and lockset (T) is defined as the set of resources for which transaction T has acquired a lock. Lockset (T) is referred to as the lock set of the transaction T. The lock set of a transaction is defined as:

$$lockset(T)=\{R|\forall M, \forall l:lock(R)=lTOwner(l,M)\}$$

Lock Release

To release a lock, the lock state of the resource being unlocked must be updated and the resource must be removed from the lock set of the transaction that is releasing the lock. This lock release process is illustrated in FIG. 8 and the following pseudo code according to one embodiment of the invention:

```
   release_lock(Resource R, Transaction T)
 2    begin
 3        LockState l1 ◆ lock(R);
 4        LockState l2 ◆ 1
 5        foreach M
 6            if T    Owner(l2,M)
 7                   Owner(l2,M) ◆ Owner(l2,M) ⊖ {T}
 8            endif
 9        endfor
10        lock(R) ◆ TILS.lookup(l2)
11        lockset(T) ◆ lockset(T) ⊖ {R}
12        if (Q(1) = )
13            return
14        endif
15        /* process waiting queue here */
16    end
```

Figure 8:
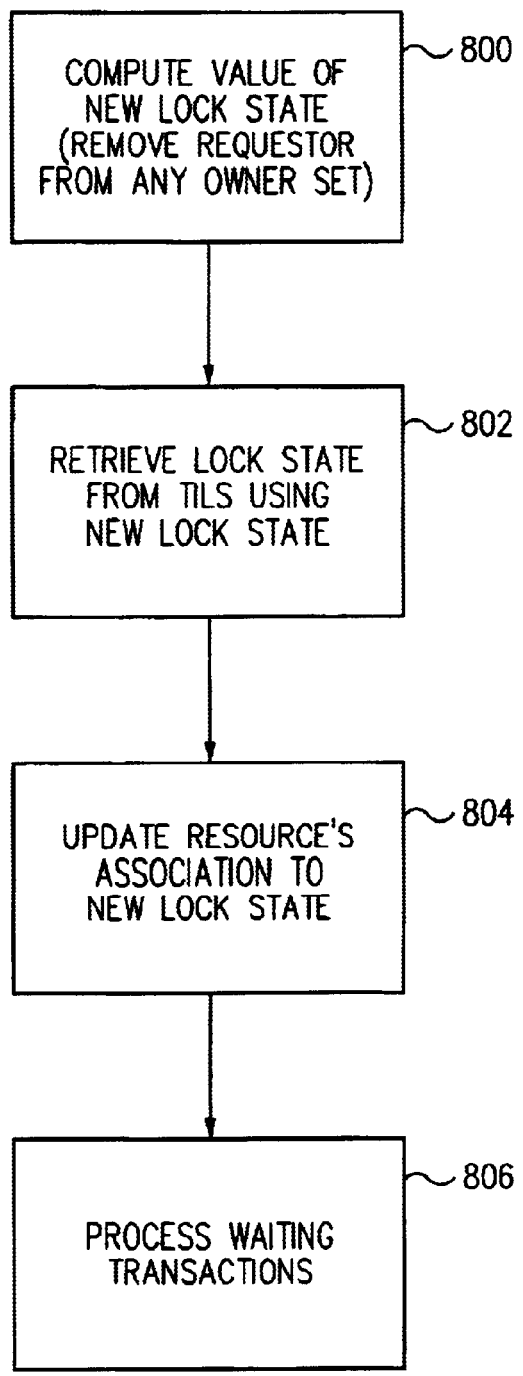
FIG. 8 illustrates the lock release process according to one embodiment of the invention.

Referring to step 800 of FIG. 8, the value of the new lock state that the resource will be associated with is computed. The new value is obtained by removing the transaction from any owner set of the lock state where it appears in. Referring to the pseudo code, to obtain the new value, the current value of the lock state is obtained and copied into a local variable (lines 3–4). The new value is obtained by removing the transaction from the owner sets (of the lock states indicated in the local variable) (lines 5–9 of the pseudo code). At step 802 and line 10 of the pseudo code, the new lock state is obtained from the TILS. At step 804 and line 11, the resource's association with the TILS is updated to reflect the retrieved lock state. Transactions waiting in the queue for the lock release are then processed at step 806 and line 15 of the pseudocode. These waiting transactions will resume at step 708 of FIG. 7.

Lock Set Elimination

As described above, each transaction maintains a lock set containing the locks that each transaction has acquired. In one embodiment of the invention, transactions don't keep track of the resources they have locked and the lock manager does not maintain any lock sets. In such an embodiment, lock acquisition proceeds as described above without the addition or modification of a lock set.

Figure 9:
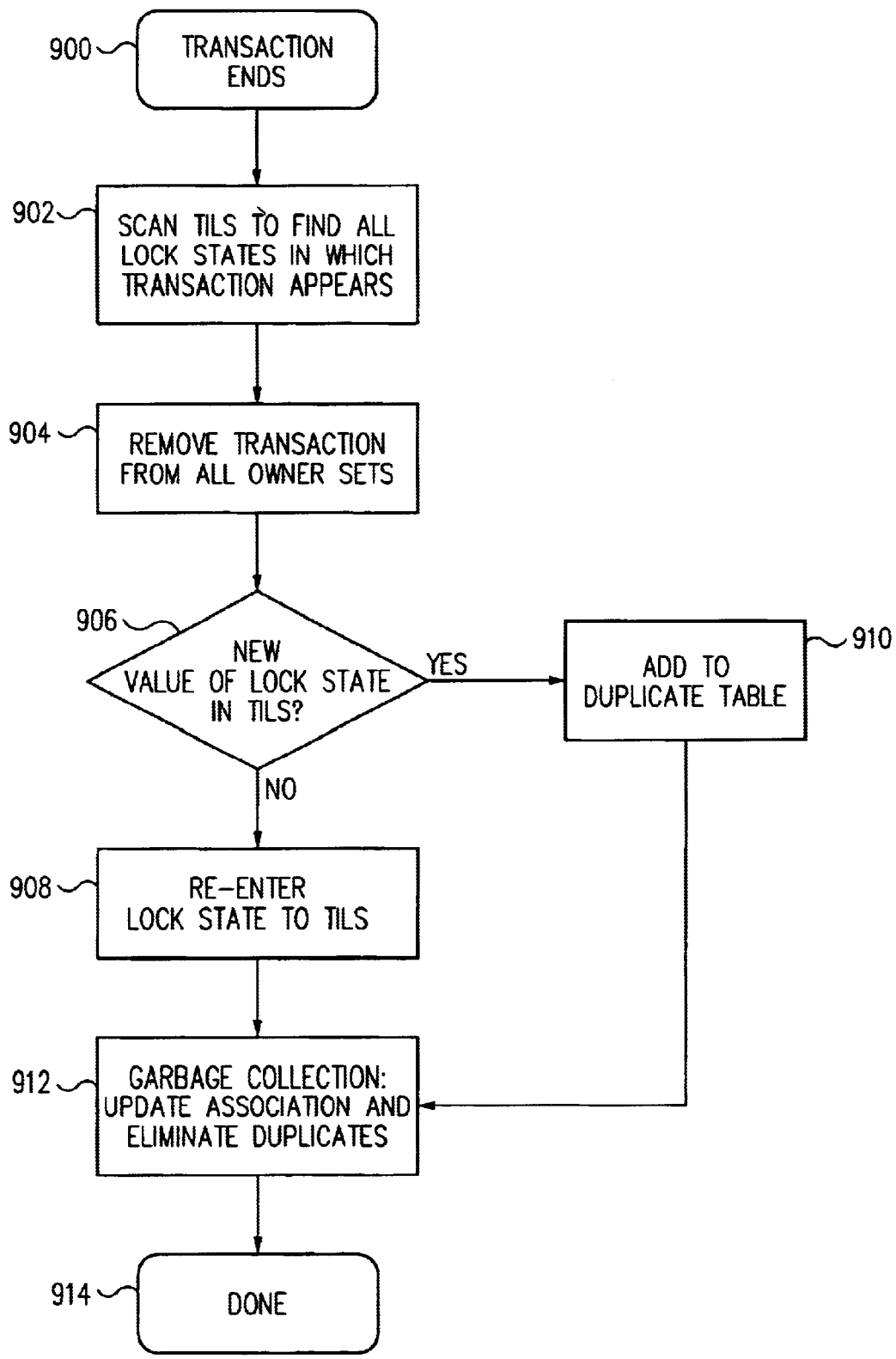
FIG. 9 illustrates the lock release process without using lock sets according to one embodiment of the invention.

FIG. 9 demonstrates the release of a lock without using lock sets. At step 900 the transaction ends. At step 902, the TILS is scanned to find all of the lock states in which the transaction appears. At step 904, for each lock state found, the transaction is removed from all owner sets where it appears. By removing the transaction from the owner set, the value of the lock state is modified. Since TILS's keys are based on the value of a lock state, this modification necessitates reentry in the TILS as a new lock state. At step 906, a determination is made regarding whether the TILS already has a lock state with a value equal to that of the modified lock state. If so, the modified lock state is not re-entered in the TILS but put instead in a duplicate table at step 910. The associations between the resources and the lock states that are updated after a lock release do not need to be changed (the lock state of the association may now belong to the duplicate table). If the modified lock state is not in the TILS, it is registered to the TILS at step 908. Processing then continues. Eventually, garbage collection is initiated (which may be asynchronous) at step 912. During garbage collection, the duplicates in the duplicate table are removed and the associations with the TILS are updated.

Figure 10:
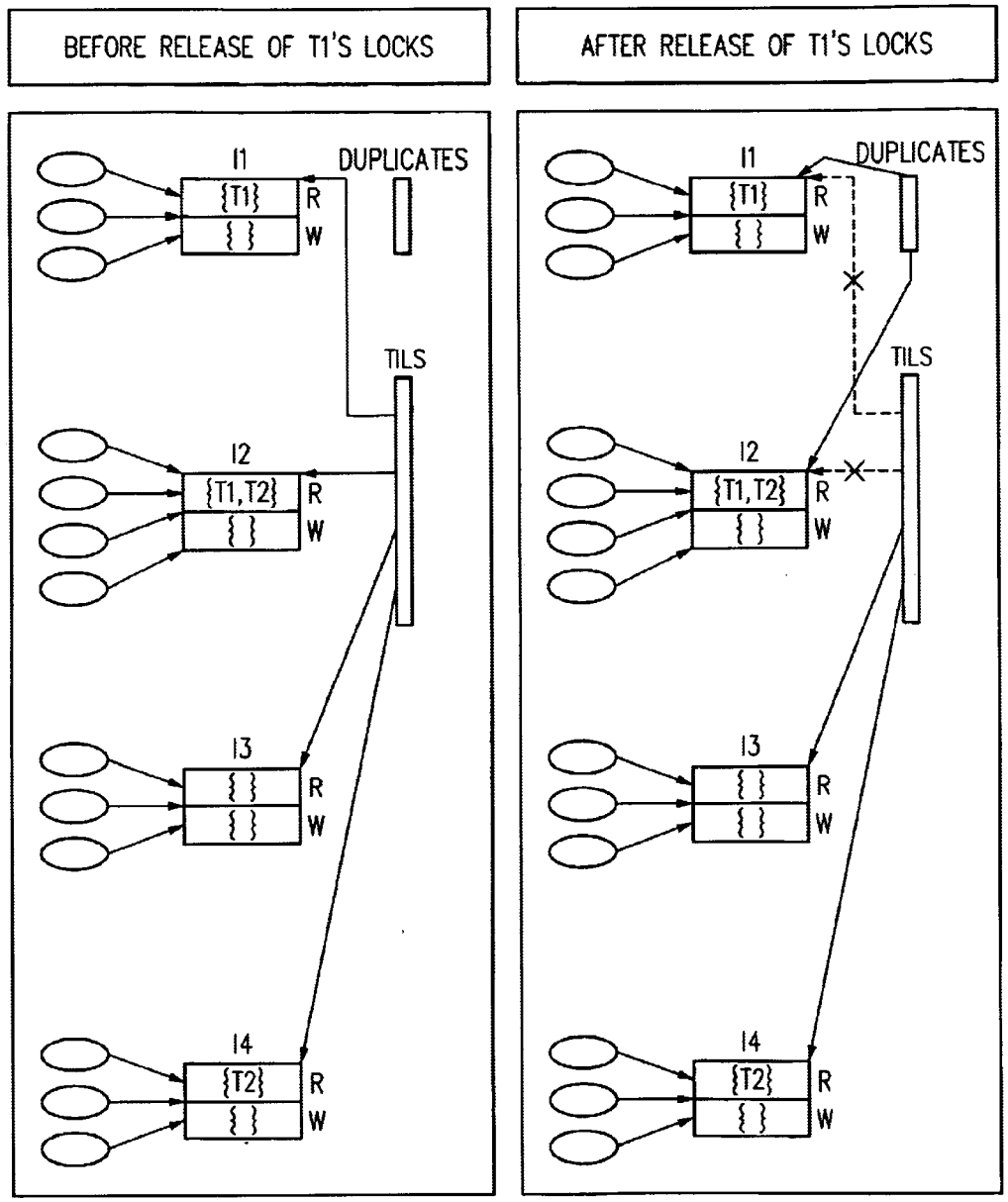
FIG. 10 demonstrates lock states and the TILS and Duplicates table when lock management is used without lock sets according to one embodiment of the invention.

Using the above lock release method, the table of duplicates are updated in addition to the TILS when other transactions release their locks. FIG. 10 demonstrates lock release without lock sets. The Figure shows resources (small circles) and the lock states that represent their lock. Before the end of transaction $T_1$, there are two lock states that represent locks owned by $T_1$ (lock states $l_1$ and $l_2$). When $T_1$ completes, it is taken out of the owner sets of these two lock states. However, the new updated value of these lock states is already represented in the TILS, so these lock states will remain out of the TILS and will not be used for updating the association of a resource upon a lock operation. After release of $T_1$'s locks, $l_1$ duplicates $l_3$, and $l_2$ duplicates $l_4$. The duplicates must be recorded in a table of duplicates in order to update them too when other transactions subsequently release their locks. For instance, after $T_1$'s termination, both the TILS and the table of duplicates contains lock states that represent locks owned by $T_2$. When $T_2$ terminates and releases its locks, it will create two additional duplicates of the "unlocked" lock state (i.e., $l_3$): $l_4$ will turn into a duplicate of $l_3$ and will be taken out of the TILS and recorded in the table of duplicates, and $l_2$ will also turn into another duplicate of $l_3$ but no table management will be necessary since $l_2$ is already in the table of duplicates.

Implementation of Lock Manager

In one embodiment of the invention, lock owner sets are represented as bitmaps. A bitmap is an array of binary digits (either a 1 or 0 in the binary number system; also referred to as bits). Additionally, each transaction is assigned a locking context that uniquely identifies the transaction.

Figure 11:
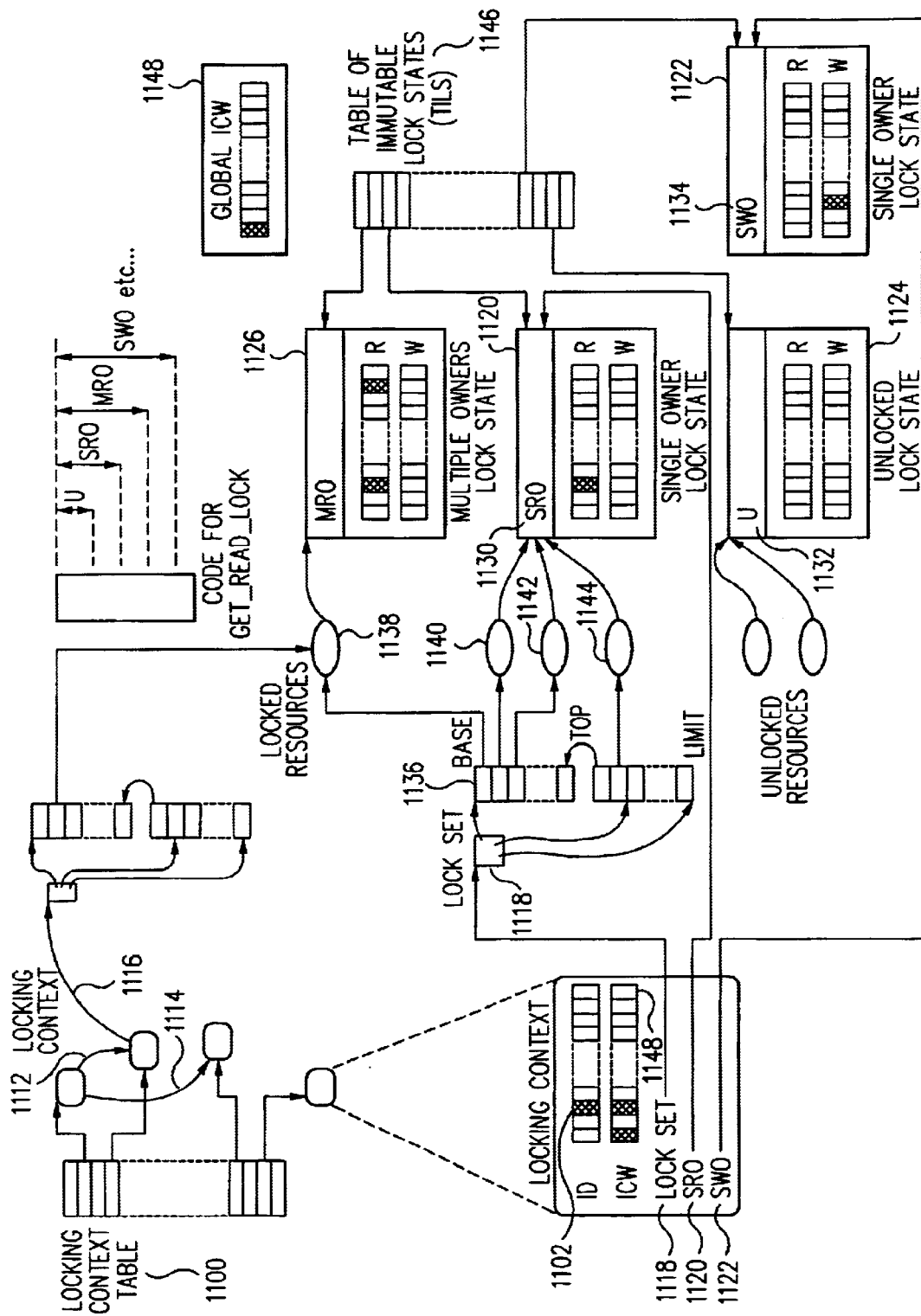
FIG. 11 demonstrates the lock manager's data structures according to one embodiment of the invention.

Bitmaps are used to map specific bits to a locking context. All bitmaps use the same mapping from locking contexts to bit numbers, i.e. the $i^{th}$ bit always represents the same locking context. Bits that are set to 1 in a bitmap indicate the membership of the owner set that the bitmap represents. FIG. 11 illustrates an overview of the data structure of the lock manager and will be discussed below.

Locking Context

Transactions request services to the lock manager using their locking context. A locking context is associated with a unique bit number (in a bitmap) that identifies it, and so its transaction, within the lock manager.

Referring to FIG. 11, a locking context is comprised of the following.

(1) The bit number 1102 that currently identifies it. This number is also an index to a table of locking contexts 1100. When changing the locking context's identifier (i.e., its bit number), the locking context location in the locking context table is changed accordingly.

(2) Links to other locking contexts 1112–1116.

(3) A lock set 1118. The present description assumes a variant of the lock manager than maintains lock sets to keep track of locks acquired by transactions. If lock sets are not utilized (as described above), the lock set reference in the locking context may be eliminated.

(4) References to specific exclusive lock states 1122 that were solely acquired using the present locking context (referred to as single-owner lock states). There is one single-owner lock state per locking mode. Single-owner lock states are used to avoid looking up the lock state in the TILS when acquiring a lock on an unlocked resource. With two lock modes, each locking context maintains two single-owner lock states, called single-read owner (SRO) 1120 and single-write owner (SWO) 1122.

As described above, the reference to an SRO 1120 or SWO 1122 is present to denote a lock state for the one transaction identified by the locking context. Thus, if a resource has no associated locks (i.e., it is unlocked), the reference in the locking context may be utilized instead of looking up the lock state in the TILS.

Lock States

Each lock state 1120–1126 is made of a header 1128–1134 that contains information, such as a type tag (type tags are discussed in detail below) and other extra data used for the maintenance of the TILS. Each lock state also contains an array of bitmaps, each bitmap representing an owner set for a given locking mode. When only read and write locking modes are used, a lock state contains two such bitmaps only (a Read bitmap and a Write bitmap).

Lock Set

A lock set 1118 identifies the locks that a current transaction owns. In one embodiment lock sets are maintained in a linked list. A linked list is a list of elements (e.g., a reference to a resource) and a link pointing to another element.

Figure 12:
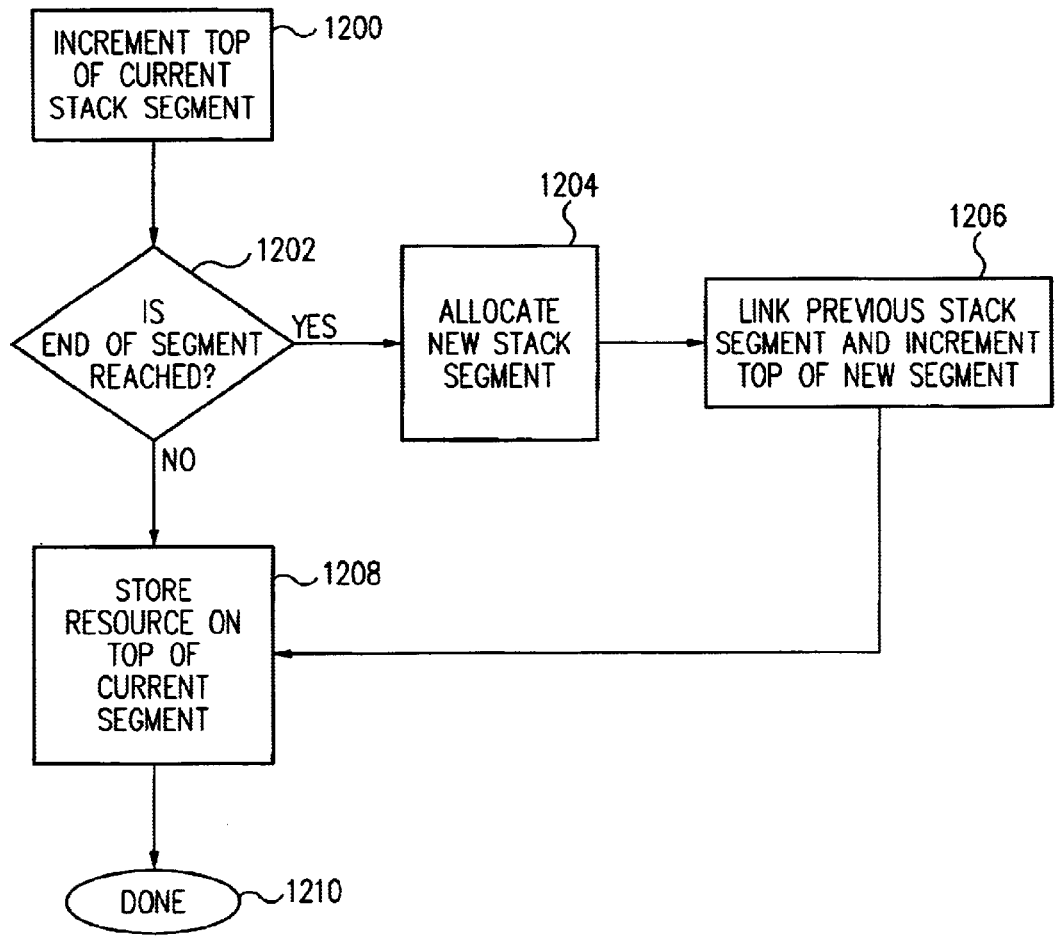
FIG. 12 illustrates the use of a stack for a lock set according to one embodiment of the invention.

In another embodiment, lock sets are implemented as segmented stacks of references to resources. A stack is a data structure such that information added or pushed onto the stack is the last to be moved or popped off of the stack (referred to as First-In-Last-Out or FILO). In one embodiment, each element pushed onto the lock set stack 1136 is comprised of a reference to a resource 1138–1144. When a transaction acquires a new lock, the resource must be added to the stack 1136. FIG. 12 demonstrates the addition of a resource to a lock set. At step 1200, the top of the current stack segment is incremented, and at step 1202 a boundary check is conducted to determine whether the end of the current segment is reached (i.e., whether there is enough room in the current segment to add the resource's reference). If the check succeeds (i.e., there is enough room), the reference to the resource is stored on top of the stack (at the location where the stack pointer points) at step 1208. Otherwise, a new segment is allocated at step 1204. At step 1206, the first location of the new segment is used to link to the previous current segment of the stack, and the new segment becomes the new current segment. The top of the stack is then incremented at step 1206 and the reference of the resource is put at that location at step 1208.

When a transaction is complete, each element of the stack (which contains a reference to a resource) is popped off of the stack and the associated resource is unlocked. Each element is popped off of the stack in this manner until the transaction's stack is empty.

Table of Immutable Lock States (TILS)

The lock manager maintains an associative table of immutable lock states 1146, the TILS. In one embodiment, the TILS can be implemented as a hash table. A hash table is a table of information that is indexed by a unique number (referred to as a hash code) that is obtained by a hash function. A hash function takes known information as input, and numerically manipulates the information to produce the hash code as output. In one embodiment, the input for the hash function consists of the lock state information (e.g., the bitmaps of each lock state).

Lock Manager Execution

The lock manager cooperates with a resource manager (a utility that manages all resources) to initialize associations between resources and lock states, and to garbage collect unused lock states. Unlocked resources are associated with a lock state that represents the unlocked state. In one embodiment, upon encountering an unlocked object or resource, a direct pointer to the "unlocked" lock state is stored in the object.

Locking Operations

In one embodiment, locking operations may make use of two techniques to improve performance: dispatching to specialized code according to lock state type, and non-blocking synchronizations.

Dispatch to Specialized Code

Dispatching to specialized code comprises executing specific or specialized code depending on the type of lock state encountered. The lock manager assigns to each lock state a type that corresponds to one of the six following categories:

1. unlocked (U): the lock state type that represents the lock of an unlocked resource. There is only one lock state of this type.
2. single read owner (SRO): the lock state type that represents ownership by a single owner in read mode only. There is one lock state of this type per active transaction.
3. single write owner (SRO): the lock state type that represents ownership by a single owner in write mode. There is one lock state of this type per active transaction.
4. multiple read owner (MRO): the lock state type that represents ownership by multiple owners in read mode only.
5. multiple write owner (MWO): the lock state type that represents ownership by multiple owners in write mode. Lock states in this category exist only when conflicts with other transactions are ignored.
6. non-empty queue (Q): the lock state type that represents a lock with a non empty set of pending lock requests, irrespective of the value of the lock's owner sets.

The type of a lock state is assigned at the time the lock state is created. The type indicates the data structure and representation of the lock states. For instance, lock states of type Q have additional data structures related to the management of the pending queue of waiting lock requests, that lock states of any other types do not have.

The type also determines the implementation of each locking operation that may be used. In other words, the type specifies the implementation of the locking operation for that lock state (e.g., lock acquisition or lock release). The implementations of the operations are stored in memory with a specific starting point and ending point. It is possible to jump to a certain location within the memory by specifying an offset (a number that tells how far from a starting point a particular item is located). Thus, the type specifies the desired implementation by storing a vector (a variable that has both distance and direction) of offsets, with one offset per locking operation (e.g., lock acquisitions and release).

By storing the offset, a locking operation Op on a resource R may use a specific implementation of the lock operation. The locking operation uses the desired implementation by loading the offset corresponding to Op from the type of the lock state currently associated with R. The lock manager then dispatches the execution of the locking operation Op to additional code that specializes in handling lock states of that type. The lock manager dispatches the execution by adding the offset from the Op type to Op's starting point (referred to as a base address) and jumping to the resulting location.

The code for this dispatching mechanism, in the case of a read lock acquisition, is shown on the first six lines of the code illustrated in FIG. 13. The code for dispatching according to a lock state's type takes 3 instructions (lines 2, 4 and 5 of FIG. 13). By dispatching the execution of the locking operation in this manner (i.e., using offsets and jumping to the appropriate location), there is no need to use conditions at the beginning of each specialized code sequence to determine whether the specialized code is the appropriate code. For example, if the lock state type is "unlocked", then there is no need to find out in what mode the lock is owned, or testing for ownership, or to do conflict detection. All that is required is to change the resource's lock state for the lock state corresponding to a single ownership by the current transaction.

The number of lock state types may be extended to allow for varying bitmap sizes, and to dispatch operations to code specialized in handling bitmaps made of a single word, or two words or an arbitrary number of words. (The size of a word in this context is the size of one machine register, either 32 bits or 64 bits on more recent 64-bit processors such as the UltraSparc™. The space consumed by each lock state is adjusted to the minimal number of words required to represent the owner sets of that lock state. For instance, if a transaction whose locking context is assigned a bit number smaller than 63 executes a locking operation on a lock state made of 64-bit bitmaps, the dispatching mechanism would jump to a version of the code that requires only one 64-bit register (a register is a named region in memory that is required and used to hold information during the execution of instructions) per bitmap to execute set operations.

Non-blocking Synchronizations

In one embodiment, lock state sharing enables the usage of non-blocking synchronizations to change the lock state of a resource. A non-blocking synchronization requires an implementation using an atomic compare and swap operation (such as the cas instruction of the Sparc V9 processor, or the cmpxchg instruction of the Intel486 and Pentium family of processors).

FIG. 13 shows how non-blocking synchronizations are used on a case of lock acquisition, namely, read lock acquisition on an unlocked resource. A lock operation starts by reading the lock state associated with a resource (line 3). The header of the resource's lock state is used to dispatch to the execution code specialized for handling that type of lock state. Assuming the lock state was of type "unlocked", the lock manager then jumps to the code starting at line 7. Since the lock state associated with the resource was found to be the "unlocked" state, the lock manager uses the SRO lock state of the caller's locking context as the new lock state for that resource (the SRO is pre-loaded on line 6). The cas instruction is then used to test if the resource's lock state is the "unlocked" lock state and to swap it with the locking context's SRO if it is the case. If the compare-and-swap fails (given by a test at line 9), it means that at least one other transaction has managed to set its own lock while the transaction was executing instructions at lines 3 to 8. The lock manager must then retry the lock acquisition with the new lock state (lines 13 and 14 initiate the retry and jump to line 4 to re-dispatch to specialized code best suited to handle the type of the new lock state returned by the compare-and-swap instructions). Otherwise, if the compare-and-swap succeeds, the lock manager completes the lock acquisition by recording the locked resource in its lock set.

In the more general case of lock acquisition, such as when the current lock state is of type MRO or MWO, the lock manager performs ownership testing on the lock state first. If the test succeeds, nothing needs to be done because even if a lock state transition is performed by a concurrent transaction, it will not remove the ownership of the lock for this transaction.

If the ownership test fails, conflict detection may be required, depending on the type of the locking mode requested and the type of the lock state (e.g., conflict detection is not required for a read-lock request on a MRO lock state). If the request can be granted, a new lock state value is built and used to retrieve the corresponding lock state from the TILS. The resource's lock state is then changed using the cas instruction in a similar way to that described earlier. If the cas instruction fails to swap the two lock states, the lock manager retries the operation with the more recent lock state returned by the cas instruction.

If a conflict is detected, a new lock state of type Q is created and the cas instruction is used again to install it. In one embodiment, to guarantee that scheduling decisions are taken in an indivisible manner, all operations on a lock state of type Q are required to take a latch on the lock state to manipulate the queue of pending request.

Conflict Detection

Before granting a lock to a transaction, a determination is made as to whether the granting of the lock would conflict with an existing lock. A conflict may arise when a transaction owns an exclusive type of lock (e.g., a SWO), for example. Conflict detection may occur by viewing the type of lock that is held by a resource (which is stored in the lock state).

In one embodiment, upon completion of a transaction T, instead of releasing T's locks and updating associations between all of the resources locked by T and their lock states, the transaction T notifies each active transaction AT that it no longer conflicts with AT. Thus, when an AT has a conflict with a resource's lock because of a terminated transaction T that didn't change the lock states representing its locks, AT can ignore the conflict with T. Referring to FIG. 11, for this to work, the lock manager maintains in a global variable a set ICW 1148 of ignore-conflict-with transactions. When a transaction T completes, all it has to do is add its bit number in the global ICW set 1148.

In addition to the above, each locking context maintains its private copy of the set ICW 1148, and updates this copy only if a conflict with a lock can't be resolved. This changes conflict detection so that an absence of conflict for a transaction T for a lock l in a mode M is given now by:

$$IOwner(l,M) \Pi T \approx ICW(T)$$

If after the update, the conflict still can't be resolved, it means that the conflict is not due to a terminated transaction and that the lock request must wait until the conflict is clear (as described earlier, and in FIG. 7).

Memory Management

Lock states are data structures and therefore occupy memory. The memory area used for lock states is divided into three spaces: a static space, a from-space and a to-space. The static space is used to hold lock states that are always required, such as the lock state representing the lock of "unlocked" resources, or the single-owner lock states of each locking context. The static space is occupied at the startup of the lock manager. The from-space and to-space are used for memory allocation and garbage collection. Any garbage collection routine may be used. Garbage collection routines accumulate unused objects or memory and free up the space.

The lock manager provides each locking context with a private area of memory for allocating lock states. Lock states are allocated linearly with a private memory area. When an area becomes full, a new area is allocated from the current from-space. Synchronizations are required only around allocation of an area to a locking context.

Garbage collections use the locking contexts of active transactions as roots. When garbage collection completes, the TILS is scanned to remove any references to lock states left in the from-space. The triggering of garbage collections is correlated to the recycling of bit numbers (discussed below).

Recycling of Bit Numbers

To avoid exhaustion of bit numbers (which are used to identify locking contexts), one embodiment of the invention provides for the recycling of inactive bit numbers (inactive bits are discussed below). By recycling inactive bit numbers, the size of the bitmap (and the number of lock states) may be maintained as small as possible. Further, operations may be performed more quickly using a small bitmap compared to operations performed on a large bitmap.

A locking context is active if it is allocated to an active transaction. A lock state may potentially be used as long as all the bit numbers that appear in its owner sets are used by active locking contexts. A bit number is active if it used to identify an active locking context, and inactive if it does not identify an active locking context.

In one embodiment, the recycling of bit numbers is performed during garbage collection. During garbage collection, the garbage collector checks if any owner sets of the lock state (to be copied to another location) contains inactive bit numbers (e.g., bits that mapped to locking contexts of terminated transactions (as described above) that did not delete their bits from the lock states representing the locks these transactions owned upon their completion). If no inactive bit numbers are found, garbage collection proceeds as usual.

If inactive bit numbers are found, a new lock state value is built in a temporary area. This lock state value is obtained by removing all inactive bit numbers (i.e., setting the corresponding bits the owner set bitmaps to 0). Then, the TILS is searched for an existing lock state with that value. If the lookup fails, a new lock state with that value is created in the to-space and acts as the copy of the original lock state. Otherwise, the lock state retrieved from the TILS is promoted to the to-space (if it wasn't already). In both cases, the pointer to original lock state is set to refer to the copy of the equivalent lock state, cleaned from inactive bit numbers. Once garbage collection has completed, inactive bit numbers are removed from any active locking contexts where they appear, and recycled for allocation to incoming transactions.

In one embodiment, garbage collection is triggered when the number of active bit numbers has decreased significantly.

TILS Lookup Elimination

As described above, to access a lock state in the TILS, a lock state value that will be used as a key to retrieve the corresponding immutable lock state must be constructed (through a hash function). The performance of lookups depends highly on the quality of the lock state hashing functions. A poor hash function increases the size of the collision chain (a collision chain contains elements with hashcodes of equal value, i.e., when the hash function takes two different inputs and produces the same output which is supposed to be unique). Long collision chains degrade the performance of TILS lookup because a collision chain may be entirely scanned to determine whether a lock state is in the TILS.

In one embodiment, caching is used. Caching provides for the storage of information in a special location that may be used for quick access by future operations. Caching may store the most frequently used information or the information that was used last. By utilizing caching for lock states, the lock manager is provided with rapid access to frequently used or previously used lock states. If it can be determined that a specific lock state is used or likely to be used, by storing the lock state in cache, a TILS look up may be avoided.

To utilize caching, each locking context is augmented with a lock state transition cache. The lock state transition cache has one entry per type of lock state (e.g., U, SRO, SWO, MRO, MWO, and Q) and per locking operation (e.g., lock acquire or release). Each entry is comprised of the last lock state of each type that was used during a locking operation. Additionally, each entry stores the new lock state resulting from the execution of the locking operation. The last lock state is used for a comparison with the current lock state of a resource (to quickly locate the lock state). The new lock state is used to avoid building a new state and looking up in the TILS.

Cache entries corresponding to SRO and SWO lock states are immutable and used only for acquiring the lock of an unlocked resource (since both SRO and SWO are single owner lock states). Each of these cache entries is comprised of the unlocked lock state and the single-owner lock state corresponding to the transaction this cache belongs to.

The cache of a transaction T for a non-single-owner lock state (e.g., MRO) is solicited if and only if the working set of T overlaps with those of another transaction. In such a situation, it is likely that successive locking operations performed by T will perform the same lock state transition as another transaction. This likelihood results because the overlapping of the transaction's working sets correspond to shared paths in an object graph. If two transactions follow the same path but not at the same time, then the second will meet the same lock state, installed by the previous transaction, for all of the objects on that path. FIG. 5 illustrates overlapping of similar transaction paths for the three transactions $T_1$, $T_2$ and $T_3$. On the portion of the path that overlaps, each transaction will have a hit on their lock state transition cache if they follow the overlapping portion of the path in sequential order. The same heuristic applies when releasing the locks of a transaction.

In another embodiment, use of the TILS is avoided when performing lock operations. Assuming the caching mechanism just described, a new lock state is allocated whenever there is a cache miss (i.e., the lock state is not in the cache). The TILS is used at garbage collection time only, to eliminate redundant lock states.

Thus, a method and apparatus for locking for transaction processing systems is described in conjunction with one or more specific embodiments. The invention is defined by the claims and their full scope of equivalents.

Lock Filtering

When coupled to a rich programming language runtime, an automated locking system cannot issue the exact minimal amount of lock request to cover the objects used by a transaction program. As a result of this, the lock manager of such systems ends up processing many unnecessary lock requests, which can considerably slow down the system. An embodiment of the invention provides a way to reduce the volume of unnecessary lock requests that reach the lock manager, and thereby increase the efficiency of the system. The volume of unnecessary lock requests is reduced in accordance with one embodiment of the invention, by filtering unnecessary lock requests at runtime. The filtering process allows the system to avoid the processing overhead required to process a lock request at the lock manager when such processing is not necessary. Thus, an embodiment of the invention avoids processing by the lock manager unless such processing is required.

The filtering technique is primarily aimed at lock managers that use lock-value sharing but is not limited to such lock managers. Other types of lock managers may also be adapted to utilize the filtering technique described herein. The filtering methods assume that the lock management system is coupled with the memory manager of a programming system to provide a direct association between a data item and its lock. Direct association means any association that can be automatically changed using an atomic compare and swap instruction. A pointer is an example of such a direct association. The invention contemplates the use of multiple types of data structures to represent a lock. An embodiment of the invention utilizes, for example, a bitmap based lock data structure. In the bitmap instance, a lock is comprised of an array of bitmaps where each bitmap corresponds to a particular lock mode. Each active transaction registered to the lock manager is associated with a bit number for the duration of its execution.

Poor memoization cache behavior results from the frequent interleaving of accesses to object created by a transaction and objects pre-existing that transaction, as well as the frequent interleaving of accesses to mutable and immutable objects (in particular for a workload involving strings). An embodiment of the invention contemplates two methods for increasing the performance of memoization cache behavior. Both methods provide a way to filter lock requests directed at immutable and new objects, thus improving memoization cache hit and overall performance of an automated locking system that utilizes lock value sharing with memoization.

When transactions enforce strict isolation, locking is unnecessary for objects allocated by transactions in progress, hereafter called new objects. New objects fall into two categories: objects reachable only from the local state of the transaction that created them (e.g., local variables, stack of the transaction's thread(s)), and objects whose reference has been stored by their creator into objects reachable from other transactions. Objects of the first kind are unreachable from other transactions. All paths to objects of the second category are protected by an exclusive lock of their creator, since in order to store a reference in an object O, the automated locking system first obtains a write lock for O. In both cases, access to new objects by transactions different from their creator is already prohibited, therefore locking is unnecessary for new objects. In object-oriented programming systems, the elimination of locking for new objects is particularly important as objects are typically allocated at high-rate, and are very often short-lived. In the context of a transaction processing systems, such objects rarely survive to the transaction that created them. Because of their fast allocation rate, special measure must be taken to guarantee that new object are not locked. In particular, in lock manager that keeps track of lock acquired by transaction, it is crucial to avoid paying locking costs for new objects (e.g., keeping track of them). Failing to achieve this can results in memory exhaustion for transaction that allocates many short-lived objects.

Eliminating lock requests for new objects requires sophisticated program analysis, and, still, may fail to identify ahead of time all uses of references to new objects. Therefore, lock requests can still be emitted for new objects. Although this is not incorrect, it is expensive. One simple way of reducing the overhead of locking for new objects is to make them look as if they are already locked by their creator. Under this approach, new objects are associated with the SWO (1122, FIG. 11) of their creator at allocation-time, without calling the lock manager. Upon transaction completion, the shared SWO lock value is atomically turned into a shared unlocked lock value. All of the created objects look like they are unlocked and become subject to normal automated locking rules. This strategy makes transactions pay only redundant lock requests for new objects.

Automated locking systems request lock on demand by transparently augmenting transaction program with small sequence of instructions, called lock barrier, that call the lock manager when it is appropriate to do so. The location where to plant lock barriers is chosen so as to guarantee that transaction are well-formed, i.e., that before a transaction executes an operation on an object, it holds a lock that grants it the right to perform that operation. In practice, lock barriers are typically planted before every access to an object, and compiler analysis techniques are used to attempt to eliminate as many unnecessary lock request as possible. Eliminating them all is in general impossible, and in practice, the number of unnecessary lock barriers left after compiler optimization is still high enough for additional runtime methods, such as the one described in the embodiments of this invention, to pay off.

An embodiment of the invention provides an improved method for filtering lock requests (at the lock barrier) when lock requests are directed at immutable objects. Immutable objects are objects whose value cannot change after creation. An instance of java.lang.String or java.lang.reflect.methods are example of such immutable objects tin the Java™ programming language. Because such objects really represent values and cannot be updated, they do not require concurrency control. Although it is possible for an automated locking systems to identify an access to an immutable object through compiler analysis, and avoids emitting a lock barrier for it, there remains numerous cases where it is not possible to determine statically the type of an object whose reference is stored in a variable, and therefore, to determine its immutability. To reduce the overhead of locking against immutable objects, a special lock value called the "IMO" lock value is associated with every immutable object. Upon a lock request against an object associated with an IMO lock value, the lock manager ignores the lock request. There is typically only one IMO lock value in the system, and every immutable object is associated with it. For lock managers that keep track of all the locks acquired by a transaction, the use of the IMO lock value can result in substantial space savings.

Reduce Automated Locking Overhead for New Objects

In a transaction processing system that enforces strict isolation between transactions (i.e., if the transactions are ACID), the objects allocated by a transaction T can never be visible to other transactions unless transaction T commits. This is because in order to a new object to be visible to a transaction Tx, its reference must be stored in an object Oi already visible to that transaction Tx, its references must be stored in an object Oi already visible to that transaction. Doing so requires an exclusive lock to be held on Oi, which prevents Tx to access Oi. An automated locking system may generate lock requests for new objects if it cannot determine that the object was created by the transaction. Object created by a transaction might be associated with a distinguished lock value that looks like an exclusive lock of the objects creator. This value is called the CSWO of the creator transaction in the rest of this document. There are as many CSWO value as they are active transactions. CSWO can be the same unique lock value representing all write locks exclusively owned by the creator (i.e., the SWO mentioned earlier on). That way, requests to new objects can be treated as redundant lock which in turn, can be filtered out by an ownership test (see below).

Combined Ownership Test and Memoization

Before a transaction executes an operation on an object, it must guarantee that it holds a lock that grants it the right to perform that operation on the object. The set of program instructions that carry out the steps necessary to guarantee locking is known to those with ordinary skill in the art as lock barrier. In the present invention we describe a method that minimizes the number of program instructions in a lock barrier, thus minimizing the time necessary to request a lock.

Figure 14:
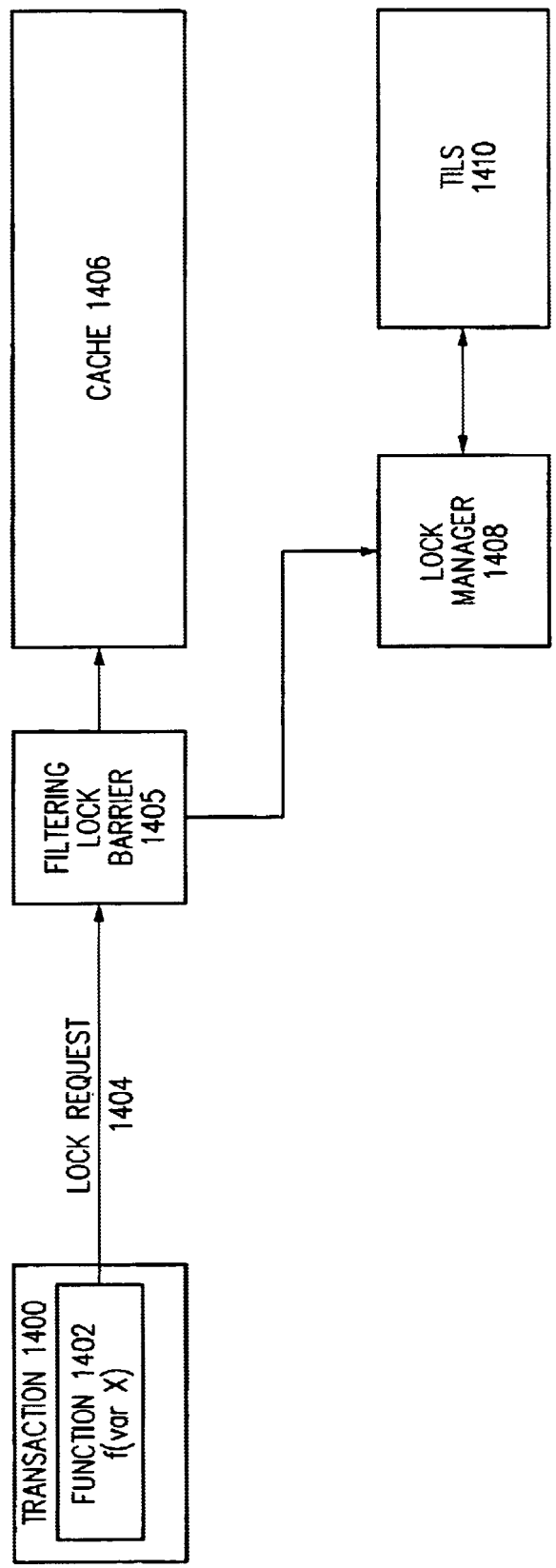
FIG. 14 comprises a high-level block diagram that illustrates the paths a data item associated with a transaction may follow to determine whether there is a lock in accordance with one embodiment of the invention.
Figure 15:
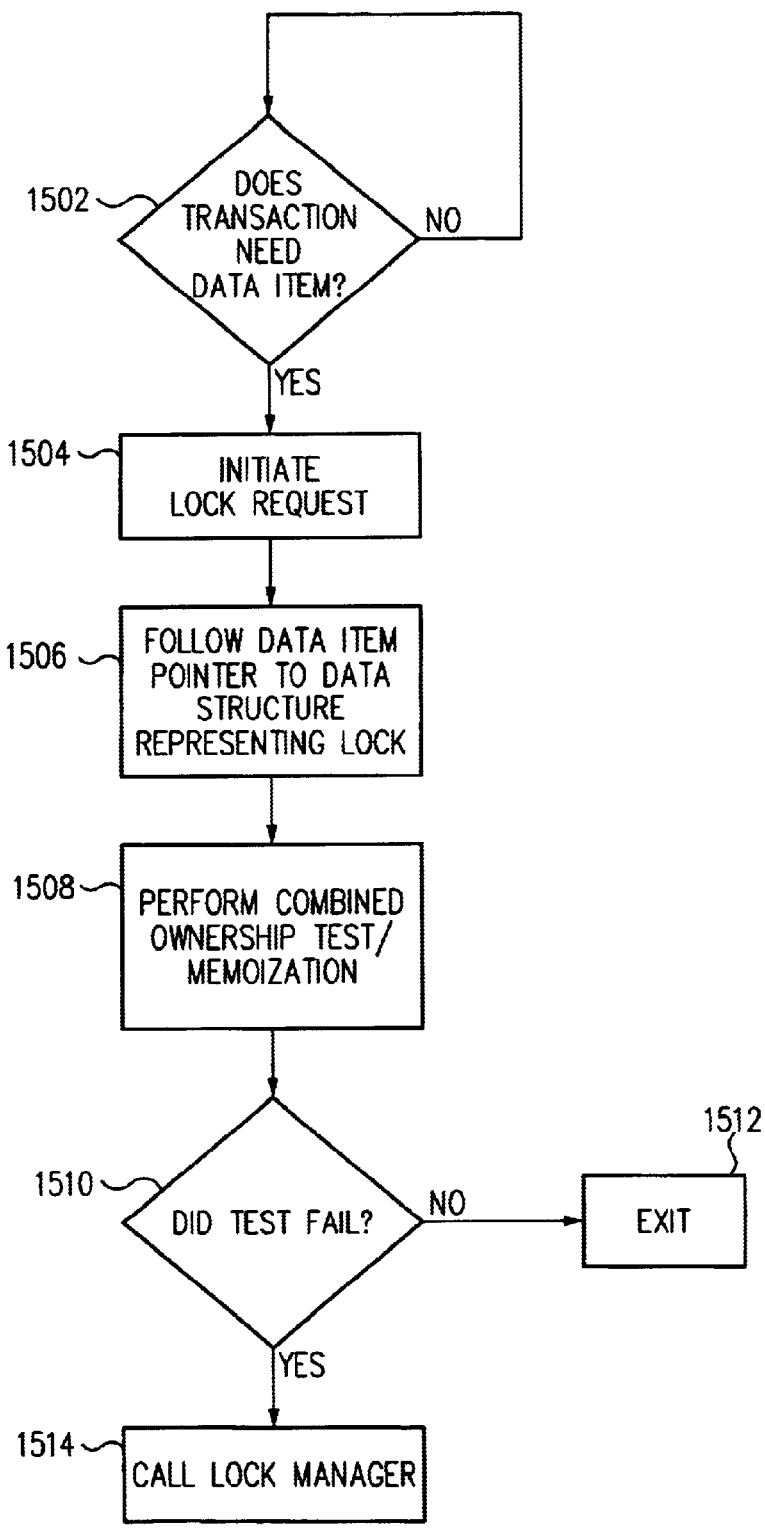
FIG. 15 comprises a flow diagram that illustrates the process utilized to determine the paths a data item associated with a transaction may follow to determine whether there is a lock.

The method involves using data structures to represent lock-state objects, thread locking context objects and lock set objects (all described above) in a manner that data in these data structures can be compared with a minimum set of instructions (ideally one atomic step). Thus, embodiment of the invention provides an improved method for filtering lock requests (at the lock barrier) when lock requests are directed at certain types of objects (e.g., immutable and/or new objects). FIG. 14 comprises a high-level block diagram that illustrates the paths a data item associated with a transaction may follow to determine whether there is a lock in accordance with one embodiment of the invention and FIG. 15 comprises a flow-diagram that illustrating the process utilized to determine the paths a data item associated with a transaction may follow to determine whether there is a lock. FIGS. 14 and 15 both generally illustrate a process for filtering lock requests in accordance with one embodiment of the invention. In the event that transaction 1400 wishes to access a data item (e.g., variable X) associated with function 1402, a lock request 1404 is initiated (See e.g., steps 1502 and 1504 of FIG. 15). To determine whether the transaction needs to acquire a lock for X, the transaction processing system follows the pointer associated with the requested data item to a data structure representative of the lock on that item (See e.g., step 1506). The system then evaluates the data structure (e.g., at filter 1405) to determine the lock state of the requested data item.

The data structure comprises any type of data structure that may represent the state of the requested data item. The data structure may, for example, be a bitmap or linked list. The evaluation performed on the data structure comprises two steps: an ownership test, that tell whether the requester already have the lock in the requested mode, and a memoization step (see e.g., step 1508), that allows the acquisition of the lock without calling the lock manager. The specifics of this evaluation are discussed in further detail below (See e.g., code block A, and FIG. 16). If the outcome of either the ownership test or the memoization results in a success (i.e., the transaction owns the requested lock), the system exits and the lock request is not passed to lock manger 1408. Otherwise, a call is made to lock manager 1408 which evaluates the lock requests using TILS 1410. Thus, the invention provides a mechanism for minimizing the number of instances where calls are made to lock manger 1408. In particular, all lock requests against lock that the transaction already owned are not processed by the lock manager. This includes all lock request to both immutable objects and objects allocated by the requester. This is because the method proposed here makes these objects look like they are already locked by the requester by associating them with an IMO shared lock state (for immutable object) and a CSWO or SWO (for new objects). Thus only requests for object that really needs coverage with a lock and those that are not currently locked by the requester go to the second stage of the filter, the memoization step. This second step further limits the lock requests that are directed to the lock manager by virtue of memoization.

An embodiment of the invention assigns the IMO lock value a value that makes it appear as if it is hold in all modes by all transactions. For example, if the data structure representative of the lock comprises a bitmap (where a lock state is made of one bitmap per lock mode), the value of the IMO lock state may be comprised of bitmaps where all slots in the bitmap are set to 1. In a similar manner the value of the CSWO of a transaction is set so that the slots in the bitmap corresponding to its transaction are set to 1 in all bitmaps (e.g., for all the locking modes). This provides a single ownership test that can filter out lock requests directed at the following types of objects:

1. Objects whose lock already is owned by the requester
2. Objects created by the requester
3. Immutable objects When combined with memoization, only real lock acquisition requests are probed against the memoization cache. Thus, filter 1405 acts to minimize the number of instances where the system must transmit lock requests to the lock manager for handling.

Figure 16A:
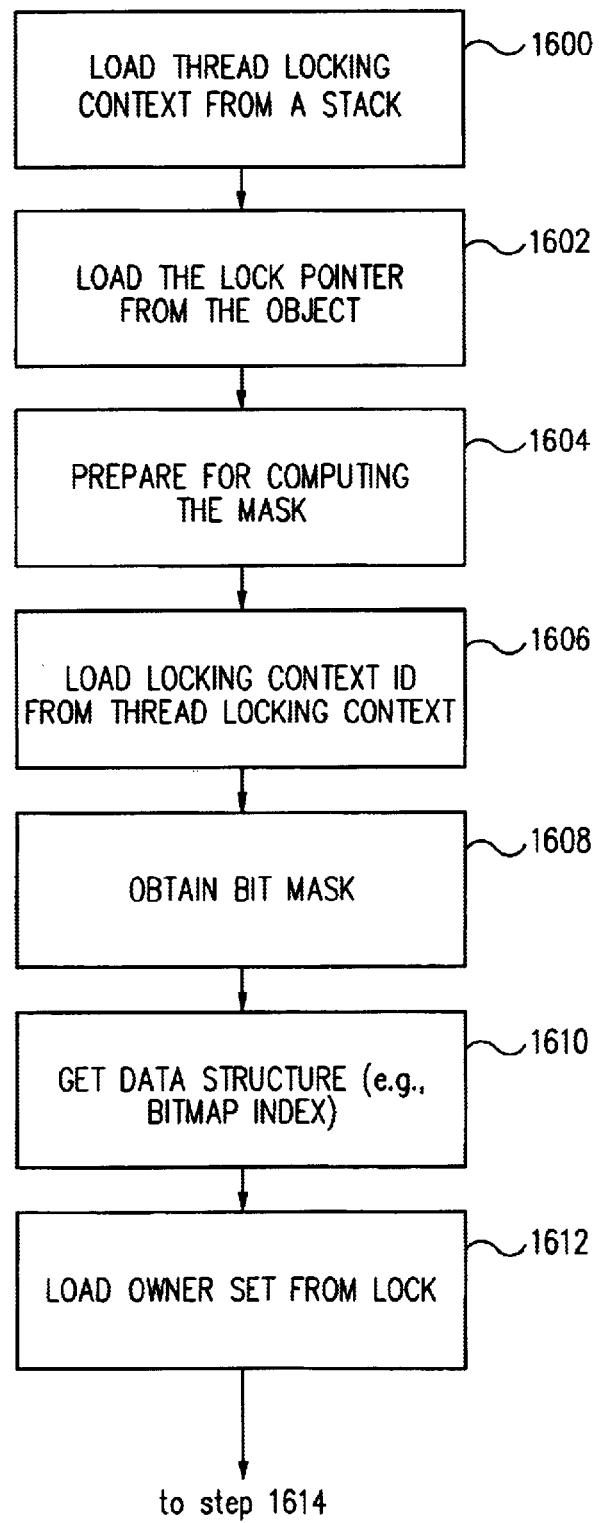
FIG. 16a and FIG. 16b illustrate the process in accordance with an embodiment of the invention utilized to filter lock states using a combined ownership test and memoization.
Figure 16B:
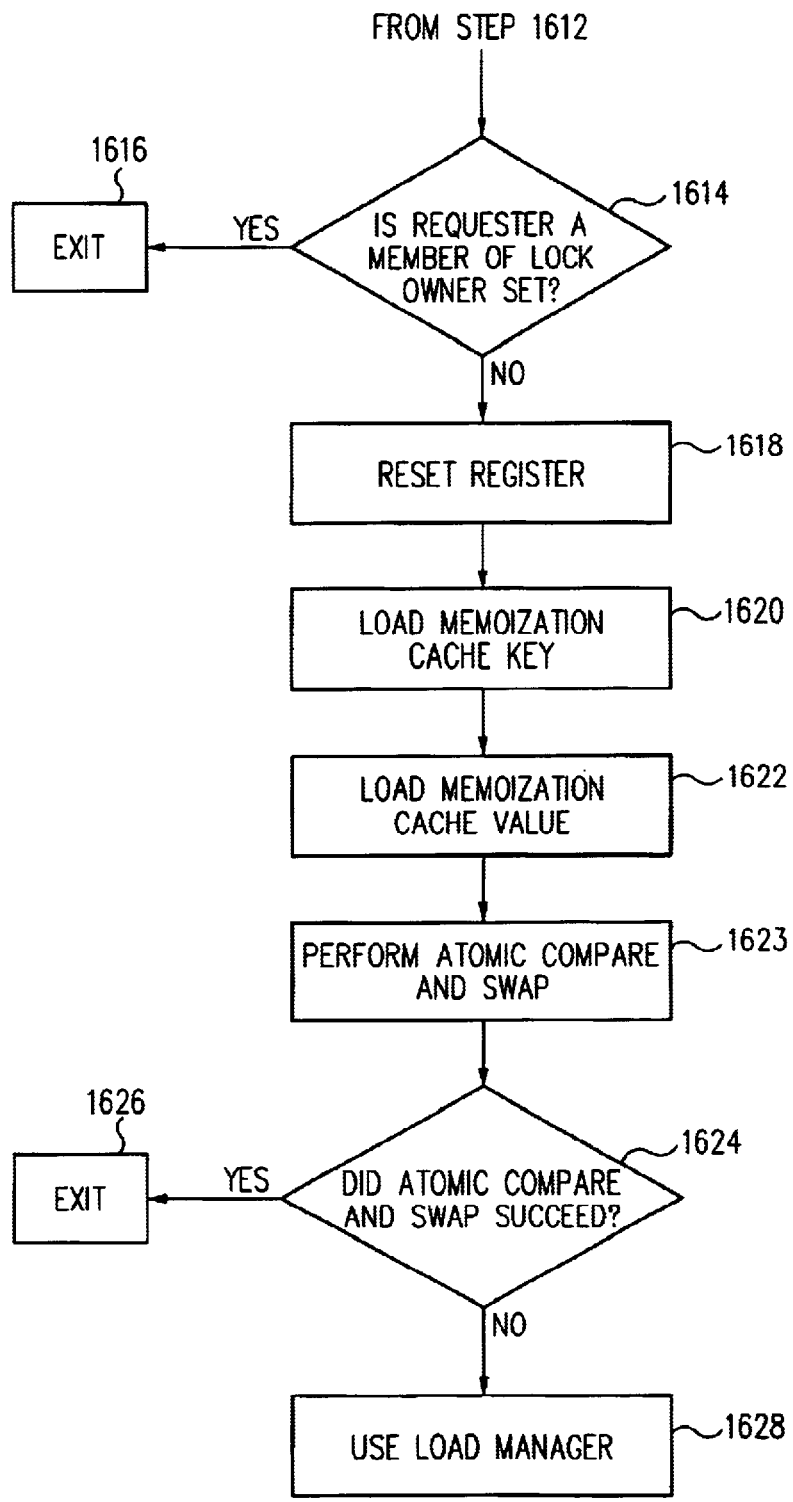

FIGS. 16a and b is a flow diagram representing the steps in the lock barrier, which is also represented in the sample assembly code below. In an embodiment of the invention the data structures representing object identity and lock states use strings of bits. The lock barrier starts by loading the thread locking context object from a known location on thread's execution stack 1600. The lock barrier loads a pointer from the object whose lock is requested at step 1602. This pointer is contained in the object and made to point to a shared lock state that represent the value of that object's lock. The method uses a bit mask to compute a result that indicates whether the requester of the lock already owns the lock represented by the shared lock state. The lock barrier prepares to compute the bit mask in 1604. The lock barrier loads the locking context indentification number from the thread locking context 1606. The bit mask is computed 1608, then the bitmap index is computed in 1610. The latter is used subsequently to carry out search and computation operations on a bit string such as the one mentioned above. The lock barrier loads the owner set corresponding to the lock mode requested from the lock 1602. The lock barrier then performs a bitmap comparison with the owner set using the bitmap index in 1614. If this binary operation results in a success the lock request is considered a success and the lock barrier exits. If the lock request is not resolved, the lock barrier proceeds to resetting the CPU register in 1620. The lock barrier then loads information from the thread's memoization cache at 1622: first it loads the lock pointer that will be compared with that loaded from the object and called the cache key (or key), then it loads the lock pointer that will replace the one currently stored in the object if the atomic replacement can be made; this second lock pointer is called the cache value (or value). Next, the lock barriers proceeds to atomically compare (1623) the key with the lock pointer stored in the object, and replace it if they're equal with the value. If the atomic compare and test succeeds (1624), the request is considered successful and the lock barrier exits in 1626. If none of these steps succeeds, the lock barrier calls the lock manager in 1628 to handles the lock request.

The following example is a lock barrier written in assembly language using the SPARC processor instruction set (SPARC is a trademark on Sun Microsystems). In this example the first 9 instructions (lines 2–10) are for the ownership tests and filter all unnecessary lock requests. When a lock acquisition fails the first test, and needs to access the cache, the cost will be 6 more instruction (lines 11–16). Only when a lock acquisition fails the first tests that the lock manager is called. The size of the lock barrier for this strategy is at maximum 18 instructions.

| | | |
|---|---|---|
| 1. begin_lock_barrier: | | |
| 2. ld | [%fp+tlc_offset],%o0 | load the thread locking context TLC from a stack |
| 3. ld | [addr+lock_offset],%o1 | load the lock pointer from the object |
| 4. or | %g0,1,%o3 | |
| 5. ld | [%o0 + 1cid_offset],%o2 | load Locking Context ID from TLC |
| 6. sllx | %o3, %o2, %o3 | Get the 64 bit mask |
| 7. srl | %o2, 6, %o2 | Get the bitmap index |
| 8. ldx | [%o1, %o2], %o2 | load read o ner set from lock |
| 9. andcc | %o2, %o3, %g0 | check if requester is a member of the lock's read owner set |
| 10. bne | end_lock_barrier | branch to exit if yes |
| 11. add | addr,lock_offset, %o1 | reset %o1 |
| 12. ld | [%o0 + cache_key], %o2 | load key from the cache |
| 13. ld | (%o0 + cached_val], %o3 | load value for the key from tlc cache |
| 14. cas | [%o1], %o2, %o3 | if success, %o3 == %o2, otherwise, %o3 = current lock value |
| 15. cmp | %o3, %o2 | check result of atomic compare and-swap |
| 16. be,a | end_lock_barrier | exit if success |
| 17. nop | | otherwise proceed to calling Locking Manager |
| 18. call | glcMajorGetReadLock, 4 | Registers 0, 1, 2 and 3 are correctly set for the lock manager |
| 19. mov | addr, %o2 | |
| 20. end_ lock_ barrier: | | |

This method presents several advantages over prior art. In a situation where lock requests are directed at immutable and new objects, the common way is to test whether the lock pointer of the requested object is either a creator single write owner (CSWO) or an immutable multiple owner (IMO) lock value. This however increases the pathlength of a lock request with two tests and branches. Added to the usual test of ownership of the lock to filter redundant lock request, this unreasonably increases the size of a lock barrier.

In an embodiment of the present invention, bit maps are used to represent the owners of a lock, i.e., the transaction that acquired that lock. With bitmap based implementation it is possible to set bit values such that a lock request would result systematically in a success. For example, in the case of IMOs lock states made of one bitmap per lock mode, the values of lock states may all be set to 1, which would make the lock virtually owned by all transactions. Another example, the value of the CSWO of a transaction may be set so that the slot corresponding to its transaction is set to 1 in all the bitmaps (i.e., for all the locking mode).

Filtering Using Multiple Lines Per Memoization Cache

In another embodiment of the present invention, multiple lines are used for the memoization cache in order to increase the efficiency of the cache by caching more that one memoized lock operation. This embodiment, unlike that discussed in FIG. 16, does not favor redundant lock request to the detriment of lock acquisition. Thus, the cost for the lock barrier is the same for both lock acquisition and redundant lock barriers resulting in a smaller overall lock barrier size.

Figure 17:
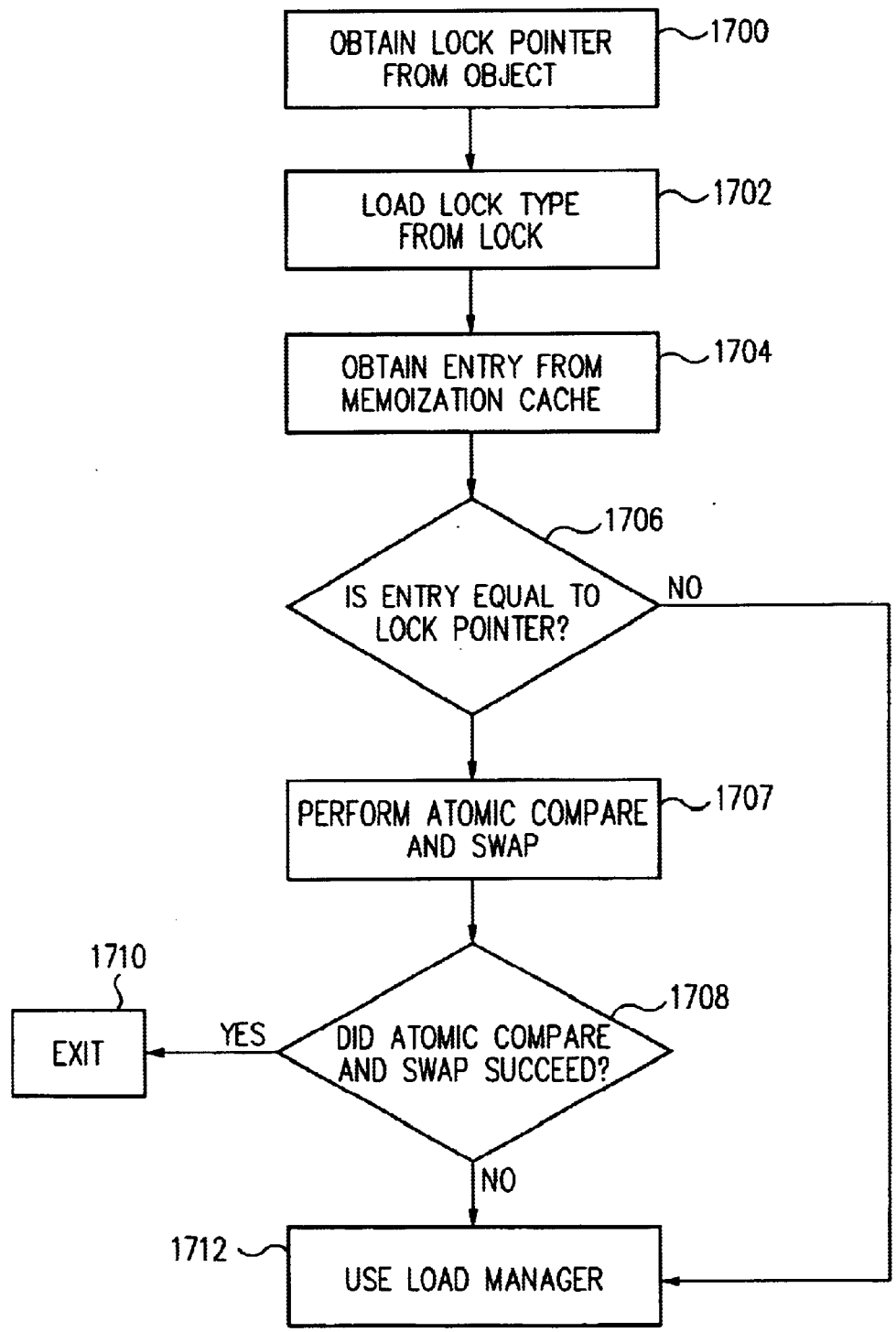
FIG. 17 illustrates filtering using multiple lines per memoization Cache in accordance with one embodiment of the invention.

In this embodiment, block 1508 of FIG. 15 is implemented as illustrated in FIG. 17 and consists of using multiple cache lines for the memoization cache. The cache line is selected based on the lock request type contained in the object's lock. The lock request type is a combination of the lock mode requested and the type of the object's lock. The type of lock may be stored in the lock itself to save the overhead of having to maintain the information (i.e. lock type) in other location when a lock state changes. For example, use of special memory alignment on lock pointers may require changing all locations holding the lock pointer when the type of lock changes because of a lock release.

The type of a lock is initialized upon its allocation, and can be changed upon a lock release. For example, lock state sharing when done without lock bookkeeping can change the value of a shared lock state—including its type. When the value of a shared lock state needs changing, for example during a lock release operation, the lock manager carefully cleans all the memoization cache prior to changing the value of the shared lock state. This forces all lock requests to probe the table of shared lock states, which requires synchronization with lock release operations.

A lock barrier consists of first loading the type of the lock requested and using the type to index the memoization cache. The pseudo code for the lock barrier of the present embodiment is as follows:

```
LockState currentLockState = object.currentLockState;
int cacheline = currentLockState.cacheLineSelector;
MemoizationCache mcache = currentThread( ).getMemoizationCache( );
if (mcache[Request] [type].currentLockState == currentLockState) {
    success = atomicCompareAndSwap (&object.currentLockState,
       currentLockState,mcache[Request] [type].requestResult);
}
if (!success) {
    LockManager.processRequestAndUpdateMemoizationCache
       (currentThread( ), Request,object);
}
```

The above pseudo code is a representation of the process of FIG. 17. Starting with block 1700 of FIG. 17, when a transaction needs a lock, it obtains the lock pointer from the object (object.currentLockState) using the lock pointer's address. The lock pointer's address is computed from the thread-locking context maintained in the stack. Using the lock pointer, the lock is obtained and the lock type is extracted from the lock (1702). The lock type is stored in a special location in the lock in this example. The lock type serves as an index to the memoization cache, which contains entries for the different lock types. The entry in the memoization cache is obtained at step 1704 and compared to the lock pointer at step 1706. If the entry is not equal to the lock pointer, the Load manager is called (1712) to perform the normal process of locking objects. However, if the entry compares with the lock pointer, an atomic compare and swap operation (1707) is performed on the current lock value and the value pointed to by the memoization cache entry. The process exits (1710) with a successful atomic test (1708), otherwise, the Load manager is called to perform the normal process of locking objects (1712), which includes processing the request for a lock and updating the memoization cache.

In this embodiment, there is one multi-line memoization cache for each locking operation (e.g. one for read lock operation, and one for write lock operation). A given lock state will always be located at the same place in all memoization cache irrespective of the locking operations that are performed. For example, during a read lock barrier, the index from the information contained in the lock pointed to by the object is used to obtain the lock pointer stored in the memoization cache corresponding to the read lock operation. Once the correct line of cache is selected, the lock barrier proceeds as for the single-line memoization cache method discussed above: the cache line's key and value are loaded, then the key is compared with the object's current lock pointer and replaced with the value if they are equal, using an atomic compare and swap instruction. In this embodiment, no hashing or linear search is required because the information is simply fetched using the lock provided by the object.

Finally, this embodiment can be combined with other embodiments of the present invention to achieve desired result. A sample code block follows:

```
Code Block B:
/* here, addr is the register holding the object's reference */
ld    [%fp+tlc_offset], %o0              load tlc
ld    [addr+lock_offset], %o2            load the lock pointer
add   addr, lock_offset,%o1              computer the lock
                                         pointer's address
                                         for step 2
ld    [%o2,chace_line_selector_offset],  load the lock's cache
      %o2                                selector
add   %o0,%o2,%o2                        computer address of
                                         cache line (tlc+cache
                                         selector)
ld    [%o2,ox4],%o3                      load cached result
ld    [%o2],%o2                          load cached key
cas   [%o1], %o2, %o3                    Step 2: if success, %o3
                                         == %o2, otherwise, %o3 =
                                         current lock value
cmp   %o3, %o2                           check result of atomic
                                         compare-and-swap
be,a end_lock_barrier                    exit if success
nop                                      otherwise proceed to
                                         slow path
call glcMajorGetReadLock, 4              %o0, %o1, %o2, %o4
                                         correctly set up by lock
                                         barrier.
mov addr, %o2
End_lock_barrier:
```

Thus, a method and apparatus for filtering lock states is described in conjunction with one or more specific embodiments. The invention is defined by the claims and their full scope of equivalents.

What is claimed is:

1. A method for managing access to a plurality of resources comprising:
   obtaining a request from a transaction to lock a resource; and
   obtaining an association of said transaction and a lock state related to said resource; wherein said obtaining said association of said transaction and said lock state further comprises obtaining a pointer from said transaction to said lock state.

2. The method of claim 1 wherein said obtaining said association of said transaction and said lock state further comprises obtaining said lock state from a data cache if a first test result indicates a failure.

3. A method for managing access to a plurality of resources comprising:
   obtaining a request from a transaction to lock a resource; and
   obtaining an association of said transaction and a lock state related to said resource; wherein said obtaining said association of said transaction and said lock state further comprises computing a bitmap value utilizing said transaction and said lock state.

4. The method of claim 3 wherein said obtaining said association of said transaction and said lock state further comprises:
   comparing said lock state retrieved from said data cache with said bitmap value; and
   producing a second test result.

5. A method for managing access to a plurality of resources comprising:
   obtaining a request from a transaction to lock a resource; and
   obtaining an association of said transaction and a lock state related to said resource; wherein said obtaining said association of said transaction and said lock state further comprises comparing said lock state and a bitmap value and producing a first test result.

6. The method of claim 5 wherein said obtaining said association and said lock state further comprises calling a lock manager if at least one of said first test result and a second test result indicates a failure.

7. A system comprising:
   a processor;
   a memory coupled to said processor;
   object code executed by said processor for managing access to a plurality of resources, said object code comprising:
      a method obtaining a request from a transaction to lock a resource; and
      a method obtaining an association of said transaction and a lock state related to said resource; wherein said method obtaining said association of said transaction and said lock state further comprises a method obtaining a pointer from said transaction to said lock state.

8. The system of claim 7 wherein said method obtaining said association of said transaction and said lock state further comprises a method obtaining said lock state from a data cache if a first test result indicates a failure.

9. A system comprising:
   a processor;
   a memory coupled to said processor;
   object code executed by said processor for managing access to a plurality of resources, said object code comprising:
      a method obtaining a request from a transaction to lock a resource; and
      a method obtaining an association of said transaction and a lock state related to said resource; wherein said method obtaining said association of said transaction and said lock state further comprises a method computing a bitmap value utilizing said transaction and said lock state.

10. The system of claim 9 wherein said method obtaining said association of said transaction and said lock state further comprises a method comparing said lock state retrieved from said data cache with said bitmap value and producing a second test result.

11. A system comprising:
    a processor;
    a memory coupled to said processor;
    object code executed by said processor for managing access to a plurality of resources, said object code comprising:
       a method obtaining a request from a transaction to lock a resource; and
       a method obtaining an association of said transaction and a lock state related to said resource; wherein said method obtaining said association of said transaction and said lock state further comprises a method comparing said lock state and a bitmap value and producing a first test result.

12. The system of claim 11 wherein said method obtaining said association of said transaction and said lock state further comprises a method calling a lock manager if at least one of said first test result and a second test result indicates a failure.

13. A computer program product comprising:
- a computer usable medium having computer readable code embodied therein for managing access to a plurality of resources, aid computer program product comprising:
  - computer readable code configured to cause a computer to obtain a request from a transaction to lock a resource; and
  - computer readable code configured to cause a computer to obtain an association of said transaction and a lock state related to said resource; wherein said computer readable code configured to cause a computer to obtain said association of said transaction and said lock state further comprises computer readable code configured to cause a computer to obtain a pointer from said transaction to said lock state.

14. The computer program product of claim 13 wherein said computer readable code configured to cause a computer to obtain said association of said transaction and said lock state further comprises computer readable code configured to cause a computer to obtain said lock sate from a data cache if a first test result indicates a failure.

15. A computer program product comprising:
- a computer usable medium having computer readable code embodied therein for managing access to a plurality of resources, aid computer program product comprising:
  - computer readable code configured to cause a computer to obtain a request from a transaction to lock a resource; and
  - computer readable code configured to cause a computer to obtain an association of said transaction and a lock state related to said resource; wherein said computer readable code configured to cause a computer to obtain said association of said transaction and aid lock state further comprises computer readable code configured to cause a computer to compute a bitmap value utilizing said transaction and said lock state.

16. The computer program product of claim 15 wherein said computer readable code configured to cause a computer to obtain said association of said transaction and said lock state further comprises computer readable code configured to cause a computer to compare said lock state retrieved from said data cache with said bitmap value and produce a second test result.

17. A computer program product comprising:
- a computer usable medium having computer readable code embodied therein for managing access to a plurality of resources, aid computer program product comprising:
  - computer readable code configured to cause a computer to obtain a request from a transaction to lock a resource; and
  - computer readable code configured to cause a computer to obtain an association of said transaction and a lock state related to said resource; wherein said computer readable code configured to cause a computer to obtain said association of said transaction and said lock state further comprises computer readable code configured to cause a computer to compare said lock state and a bitmap value and produce a first test result.

18. The computer program product of claim 17 wherein said computer readable code configured to cause a computer to obtain said association of said transaction and said lock state further comprises calling a lock manager if at least one of said first test result and a second test result indicates a failure.

* * * * *